United States Patent
Guthrie et al.

(10) Patent No.: US 7,788,798 B2
(45) Date of Patent: Sep. 7, 2010

(54) METHOD FOR MANUFACTURING A PERPENDICULAR MAGNETIC WRITE HEAD WITH WRAP AROUND MAGNETIC TRAILING AND SIDE SHIELDS

(75) Inventors: Hung-Chin Guthrie, Saratoga, CA (US); Ming Jiang, San Jose, CA (US); Changqing Shi, Mountain View, CA (US); Sue Siyang Zhang, Saratoga, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 371 days.

(21) Appl. No.: 11/944,125

(22) Filed: Nov. 21, 2007

(65) Prior Publication Data

US 2009/0128964 A1    May 21, 2009

(51) Int. Cl.
  *G11B 5/127* (2006.01)
  *H04R 31/00* (2006.01)
(52) U.S. Cl. ............ 29/603.16; 29/603.07; 29/603.13; 29/603.18; 29/417; 204/192.32; 204/192.33; 204/192.35; 216/62; 216/65; 216/66; 360/121; 360/122; 360/317; 451/5; 451/41
(58) Field of Classification Search .............. 29/603.07, 29/603.13–603.16, 603.18; 360/212, 122, 360/317; 451/5, 41; 204/192.32, 192.33, 204/192.35; 216/62, 65, 66
  See application file for complete search history.

(56) References Cited

U.S. PATENT DOCUMENTS

| | | | |
|---|---|---|---|
| 6,884,148 B1 | 4/2005 | Dovek et al. ................... | 451/5 |
| 6,922,316 B2 | 7/2005 | Sato et al. .................... | 360/317 |
| 7,016,143 B2 | 3/2006 | Kirschenbaum et al. . | 360/77.12 |
| 7,140,095 B2 | 11/2006 | Matono .................... | 29/603.15 |
| 7,196,871 B2 | 3/2007 | Hsu et al. .................... | 360/125 |
| 7,467,461 B2* | 12/2008 | Bonhote et al. .......... | 29/603.16 |
| 2003/0182789 A1 | 10/2003 | Kagotani et al. ......... | 29/603.14 |
| 2005/0057852 A1 | 3/2005 | Yazawa et al. .............. | 360/125 |
| 2005/0068669 A1 | 3/2005 | Hsu et al. ..................... | 360/25 |
| 2005/0141137 A1 | 6/2005 | Okada et al. ................ | 360/122 |
| 2006/0044677 A1 | 3/2006 | Li et al. ...................... | 360/122 |
| 2006/0044681 A1 | 3/2006 | Le et al. ..................... | 360/126 |
| 2006/0044682 A1 | 3/2006 | Le et al. ..................... | 360/126 |
| 2006/0067004 A1 | 3/2006 | Cyrille et al. ............... | 360/316 |
| 2006/0082924 A1 | 4/2006 | Etoh et al. .................. | 360/125 |

(Continued)

OTHER PUBLICATIONS

Okada et al., "Fabricating Narrow and Trapezoidal Main Poles for Single-Pole-Type Heads" IEEE Transactions on Magnetics, vol. 40, No. 4, Jul. 2004.

*Primary Examiner*—Paul D Kim
(74) *Attorney, Agent, or Firm*—Zilka-Kotab, PC

(57) ABSTRACT

A method for manufacturing a magnetic write head having a wrap around magnetic shield. The method allows a highly accurate short wavelength such as 193 mm photolithography to be used to accurately define the placement and critical dimension of wrap around magnetic shield. The method includes the formation of a magnetic write pole, top gap, and side gap and the deposition of a RIEable fill layer thereover, and CMP to planarization. A 193 nm photolithography and ion milling is used to form a mask over the RIEable layer and one or more reactive ion etching processes are performed to pattern the RIEable layer through 193 nm photolithography mask. A wrap around shield can then be electroplated into the opening formed in the RIEable layer.

10 Claims, 32 Drawing Sheets

U.S. PATENT DOCUMENTS

2006/0168798 A1 8/2006 Naka ............... 29/603.16
2006/0174474 A1 8/2006 Le ................. 29/603.12
2007/0070543 A1 3/2007 Gunder et al. ......... 360/126
2007/0245545 A1* 10/2007 Pentek et al. ......... 29/603.13

* cited by examiner

METHOD FOR MANUFACTURING A PERPENDICULAR MAGNETIC WRITE HEAD WITH WRAP AROUND MAGNETIC TRAILING AND SIDE SHIELDS

FIELD OF THE INVENTION

The present invention relates to perpendicular magnetic recording and more particularly to a magnetic write head having a wrap around trailing and side shields structure formed by 193 nm photolithographic process to accurately align shield back-edge (throat height) to the flare point of write pole.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head has traditionally included a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic transitions in tracks on the moving media, such as in circular tracks on the aforementioned rotating disk.

In recent read head designs, a GMR or TMR sensor has been employed for sensing magnetic fields from the rotating magnetic disk. The sensor includes a nonmagnetic conductive layer, or barrier layer, sandwiched between first and second ferromagnetic layers, referred to as a pinned layer and a free layer. First and second leads are connected to the sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned rind free layer are antiparallel, scattering is maximized. Changes in scattering alter the resistance of the spin valve sensor in proportion to cos Θ, where Θ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

In order to meet the ever increasing demand for improved data rate and data capacity, researchers have recently been focusing their efforts on the development of perpendicular recording systems. A traditional longitudinal recording system, such as one that incorporates the write head described above, stores data as magnetic bits oriented longitudinally along a track in the plane of the surface of the magnetic disk. This longitudinal data bit is recorded by a fringing field that forms between the pair of magnetic poles separated by a write gap.

A perpendicular recording system, by contrast, records data as magnetizations oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole when it passes back through the magnetically hard top layer on its way back to the return pole.

Certain design parameters such as placement of the flare point (write pole flare to ABS) and shield throat height (shield back-edge to ABS) are critical to efficient write head performance. However, as the write heads become ever smaller, it becomes ever more difficult to control these desired parameters. Therefore, there is a need for a structure and/or method of manufacture that can maximize these write head parameters even in very small write heads.

SUMMARY OF THE INVENTION

The present invention provides a method for manufacturing a magnetic write head having a wrap around magnetic shield. The method includes forming a write pole with a hard mask layer formed thereover. A non-magnetic gap material is then conformally deposited, followed by a directional material removal process to form non-magnetic side gap and top sides of the write pole using ion milling or CMP. A RIEable refill layer is then deposited. A chemical mechanical polishing process is then performed. A mask is then formed with an opening configured to define a wrap around trailing shield using 193 nm photolithography. A Reactive Ion Etching (RIE) is then performed to remove the portions of the refill layer that are not protected by the mask structure. A magnetic material can then be electroplated into the opening formed in the refill layer to form a wrap around trailing magnetic shield.

The process advantageously allows a more accurate 193 nm photoresist lithography to be used to define the wrap around shield. While a 193 nm photoresist would be too thin to directly electroplate the wrap around shield, by transferring the image of the 193 nm photoresist onto the underlying RIEable layer the 193 nm photoresist can effectively be used to accurately define the placement of the wrap around shield to write pole flare point.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE EMBODIMENTS

The following description is of the best embodiments presently contemplated for carrying out this invention. This description is made for the purpose of illustrating the general principles of this invention and is not meant to limit the inventive concepts claimed herein.

Figure 1:
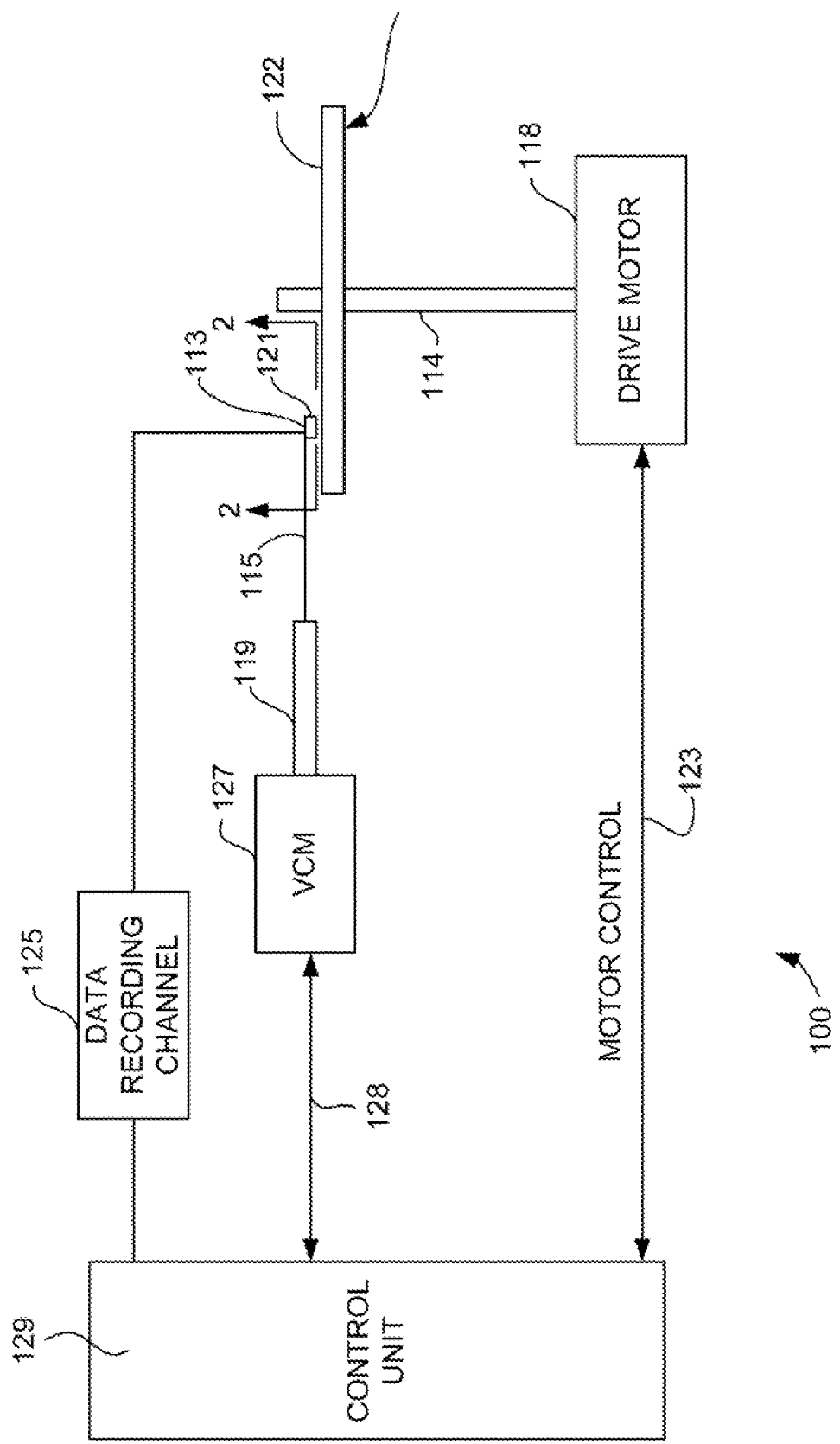
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances tine slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
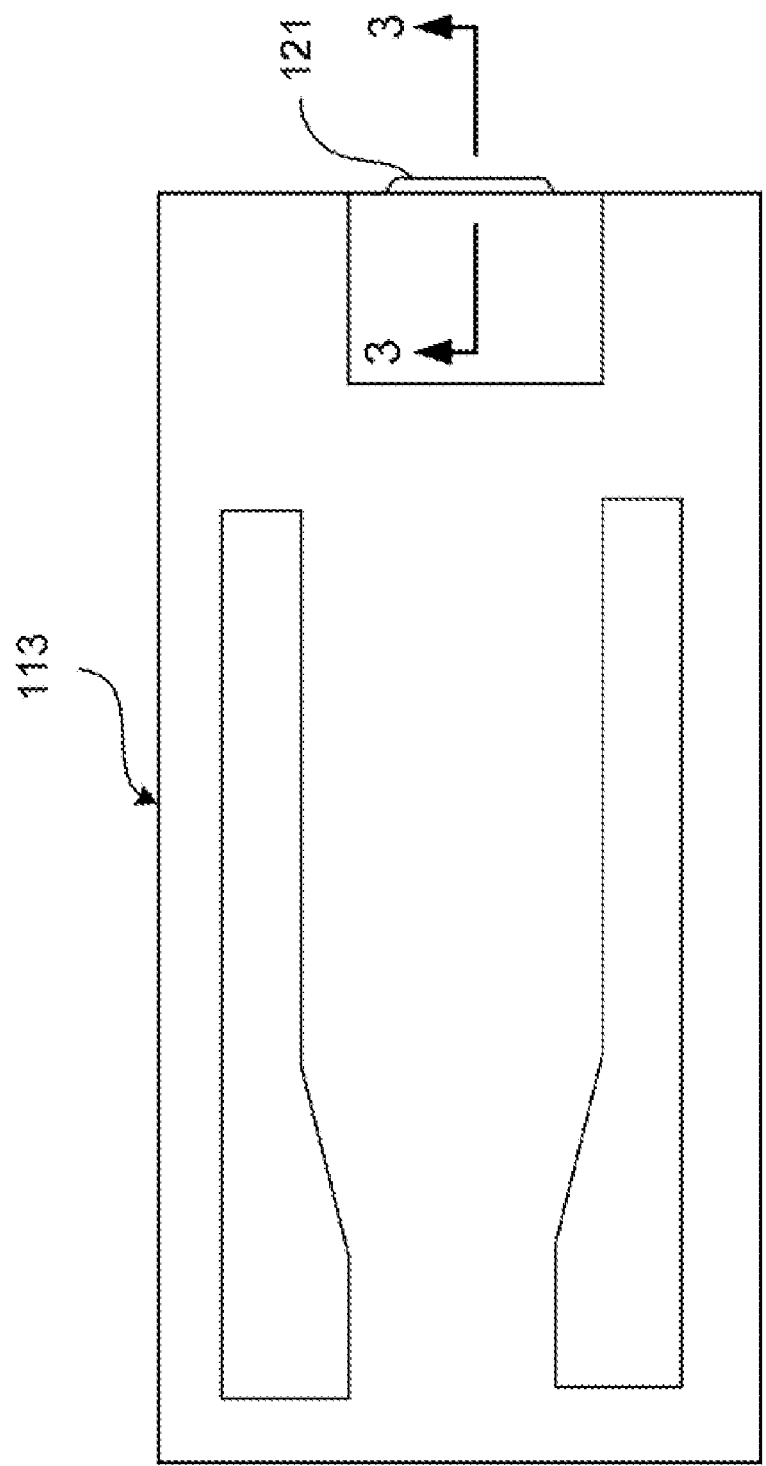
FIG. 2 is an ABS view of a slider, taken from line 2-2 of FIG. 1, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a nailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
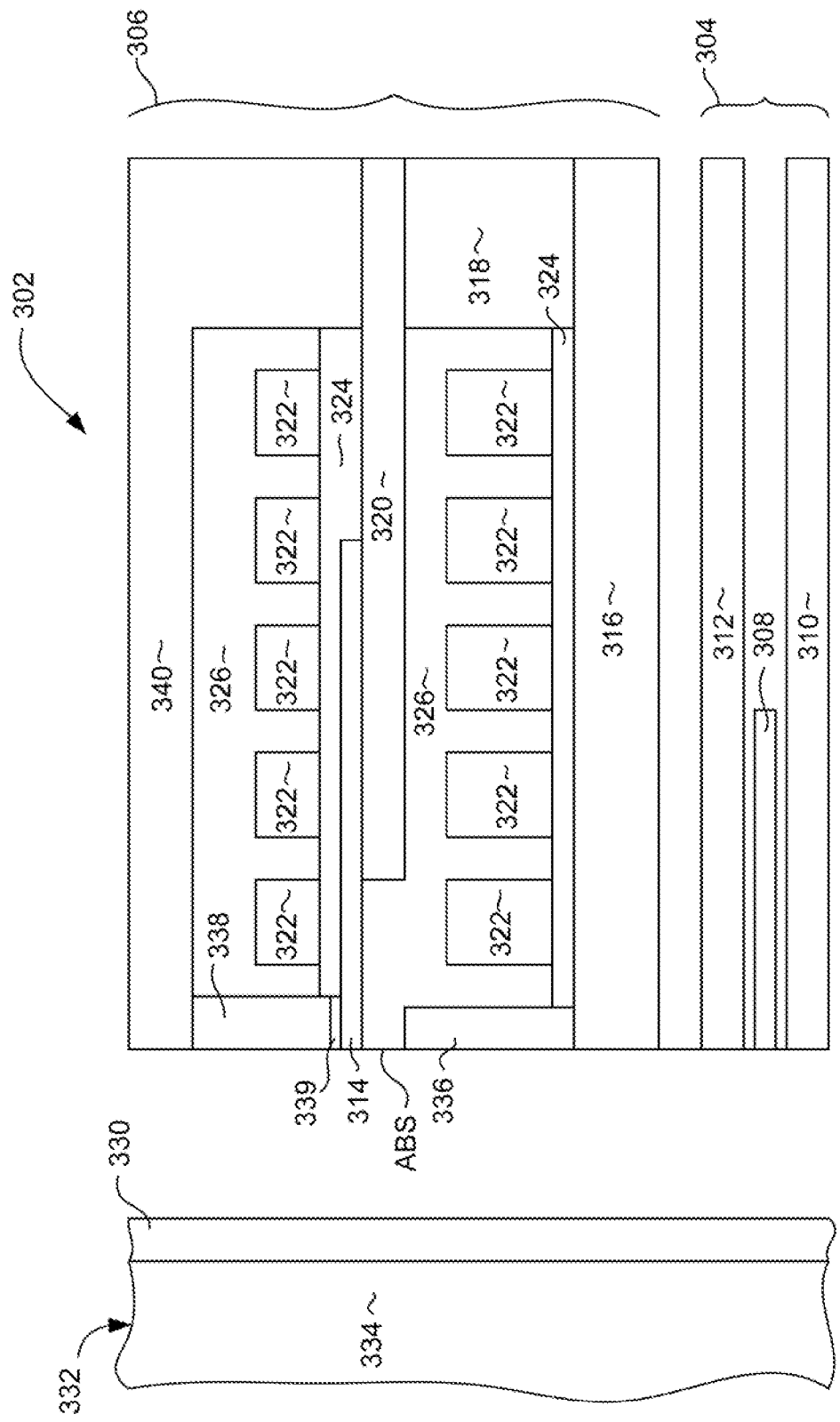
FIG. 3 is a cross sectional view of a magnetic head, taken from line 3-3 of FIG. 2 and rotated 90 degrees counterclockwise, of a magnetic write head according to an embodiment of the present invention.

With reference now to FIG. 3, the invention can be embodied in a magnetic head 302. The magnetic head 302 includes a read head 304 and a write head 306. The read head 304 includes a magnetoresistive sensor 308, which can be a GMR, or TMR, or some other type of sensor. The magnetoresistive sensor 308 is located between first and second magnetic shields 310, 312.

The write head 306 includes a magnetic write pole 314 and a magnetic return pole 316. The write pole 314 can be formed upon a magnetic shaping layer 320, and a magnetic back gap layer 318 magnetically connects the write pole 314 and shaping layer 320 with the return pole 316 in a region removed from the air bearing surface (ABS). A write coil 322 (shown in cross section in FIG. 3) passes between the write pole and shaping layer 314, 320 and the return pole 316, and may also pass above the write pole 314 and shaping layer 320. The write coil can be a helical coil or can be one or more pancake coils. The write coil 322 can be formed upon an insulation layer 324 and can be embedded in a coil insulation layer 326 such as alumina and or hard baked photoresist. A magnetic pedestal structure 336 can be connected with the return pole, extending toward, but not to, the write pole 314 to prevent tray fields, such as those from the write coil from reaching the magnetic medium 332.

In operation, when an electrical current flows through the write coil 322, a resulting magnetic field causes a magnetic flux to flow through the return pole 316, back gap 318, shaping layer 320 and write pole 324. This causes a magnetic write field to be emitted from the tip of the write pole 314 toward a magnetic medium 332. The write pole 314 has a cross section at the ABS that is much smaller than the cross section of the return pole 316 at the ABS. Therefore, the magnetic field emitting from the write pole 314 is sufficiently dense and strong that it can write a data bit to a magnetically hard top layer 330 of the magnetic medium 332. The magnetic flux then flows through a magnetically softer under-layer 334, and returns back to the return pole 316, where it is sufficiently spread out and week that it does not erase the data bit recorded by the write head 314.

In order to increase write field gradient, and therefore, increase the speed with which the write head 306 can write data, a trailing magnetic shield 338 can be provided. The trailing magnetic shield 338 is separated from the write pole by a non-magnetic write gap 339. and may be connected with the shaping layer 320 and/or back gap 318 by a trailing return pole 340. The trailing shield attracts the magnetic field from the write pole 314, which slightly cants the angle of the magnetic field emitting from the write pole. This canting of the write field increases the speed with which write field polarity can be switched on the magnetic medium by increasing the field gradient.

Figure 4:
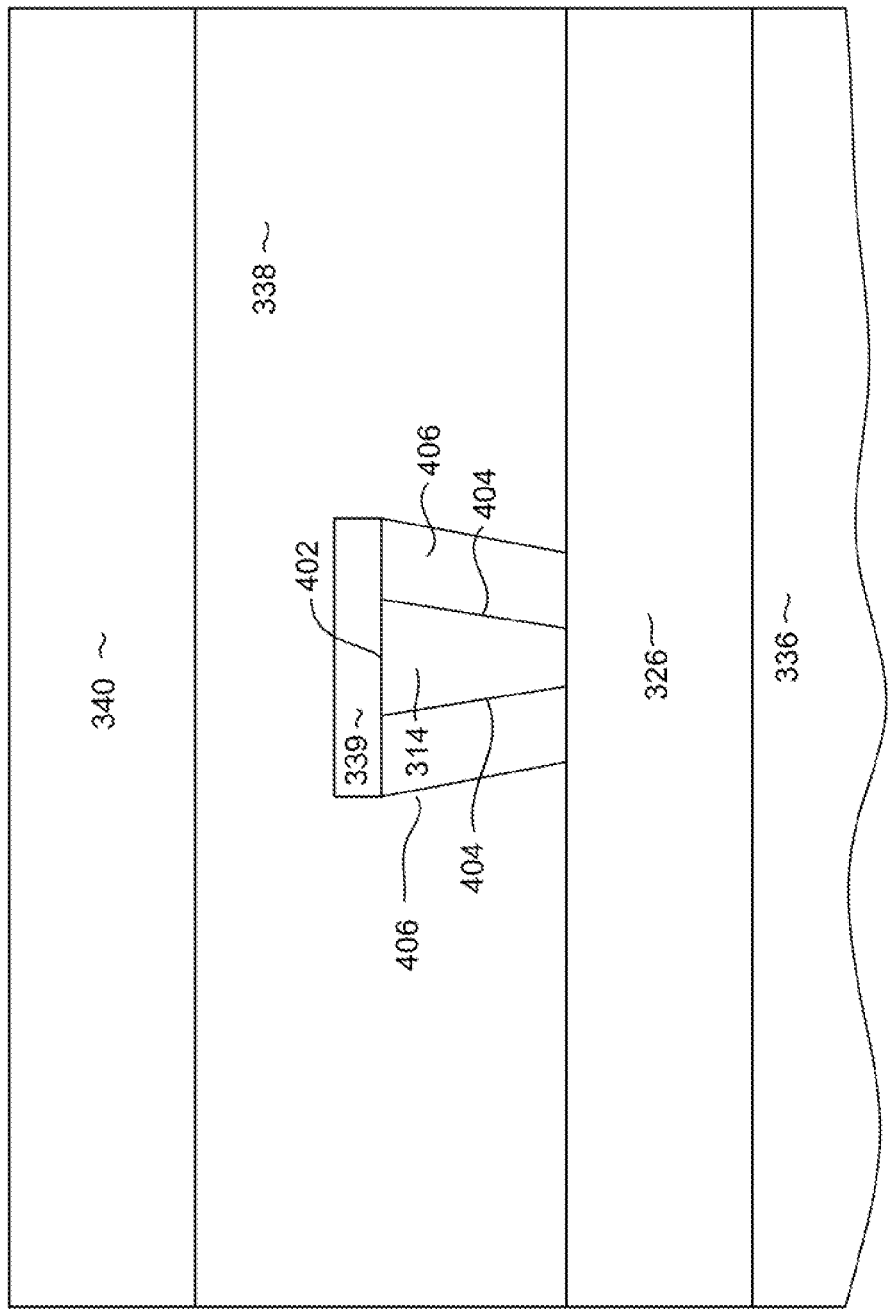
FIG. 4 is an ABS view of a portion of the write head of FIG. 3.

With reference now to FIG. 4, an enlarged view of the write pole 314 wrap around shield 338 and return pole 340 can be seen as viewed from the air bearing surface (ABS). As can be seen, the shield can be formed to wrap around the write head 314 in order to prevent adjacent track interference from stray fields, such as those from the write coil 322 (FIG. 3) or from magnetic structures in the write head 306. As can be seen, the write head 314 has a trapezoidal shape as viewed from the ABS. This trapezoidal shape helps to avoid skew related adjacent track writing such as when the magnetic head is at an extreme inner position over the magnetic medium.

The write pole 314 has a trailing edge 302 that is separated from the trailing shield 338 by the write gap 339. The write head 314 also has sides 404 that are separated from the wrap-around portion of the trailing shield 338 by non-magnetic side gaps 406. The thickness of the trailing gap 339 and side gaps 406 are important parameters for write performance. Usually the side gaps 406 are thicker than the trailing gap 339. The trailing gap 339 and side gaps 406 can be constructed of the same or different materials, such as, for example one or more layers of alumina, Rh, etc. The wrap-around shield 338 can be constructed of a material such as Co—Ni—Fe, Co—Fe or Ni—Fe. The write pole 314 can be a high moment magnetic material, and is preferably constructed of laminations of magnetic material such as Co—Fe, separated by thin non-magnetic layers to form a laminated structure.

Figure 5:
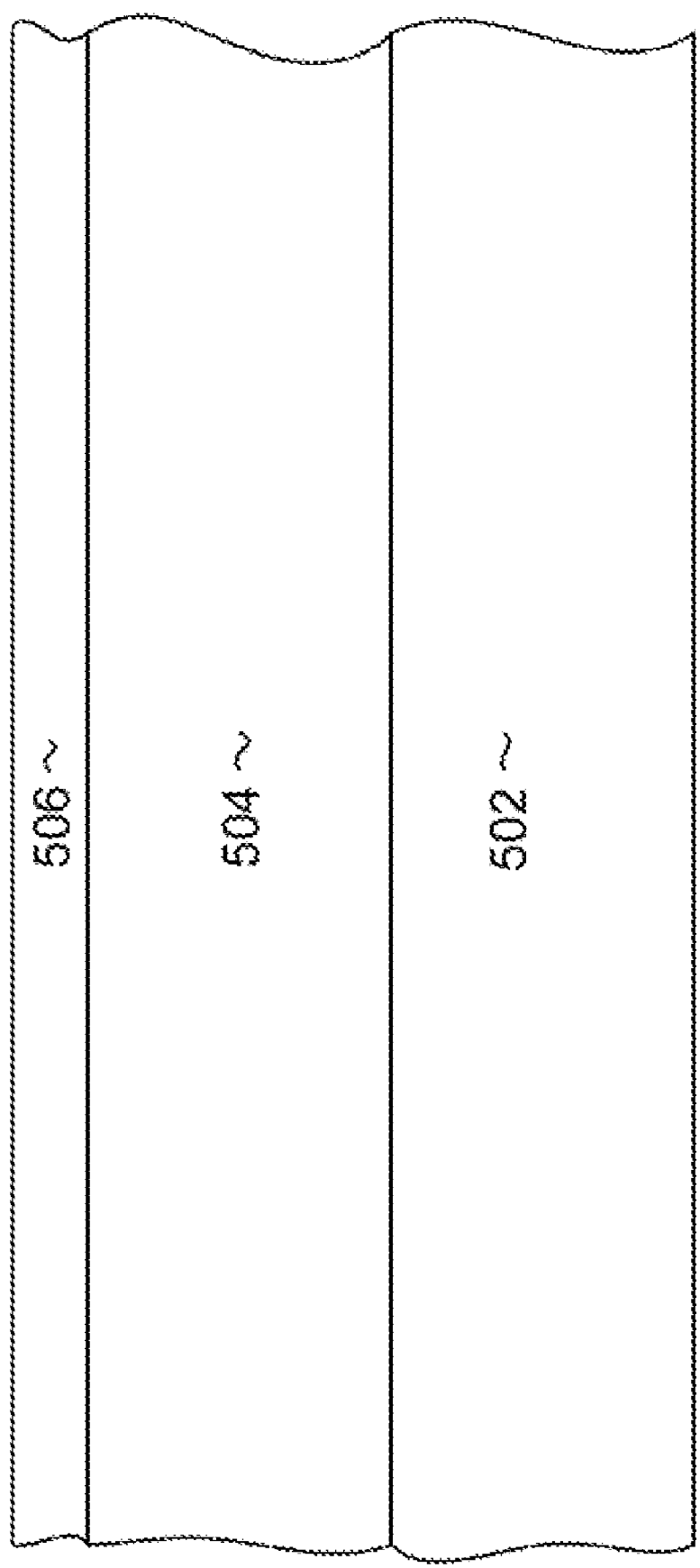
FIGS. 5-17 are views of a write head in various intermediate stages of manufacture illustrating method for manufacturing a write head according to an embodiment of the invention.

With reference now to FIGS. 5-17, a method of manufacturing a magnetic write head according to an embodiment of the invention is described. With particular reference to FIG. 5, a substrate 502 is provided. This substrate 502 can include the insulation layer 326 and/or shaping layer 320 described with reference to FIG. 3 above. A magnetic write pole material 504 is deposited over the substrate, and a thin alumina hard mask layer 506 is deposited over the write pole material 504.

Figure 6:
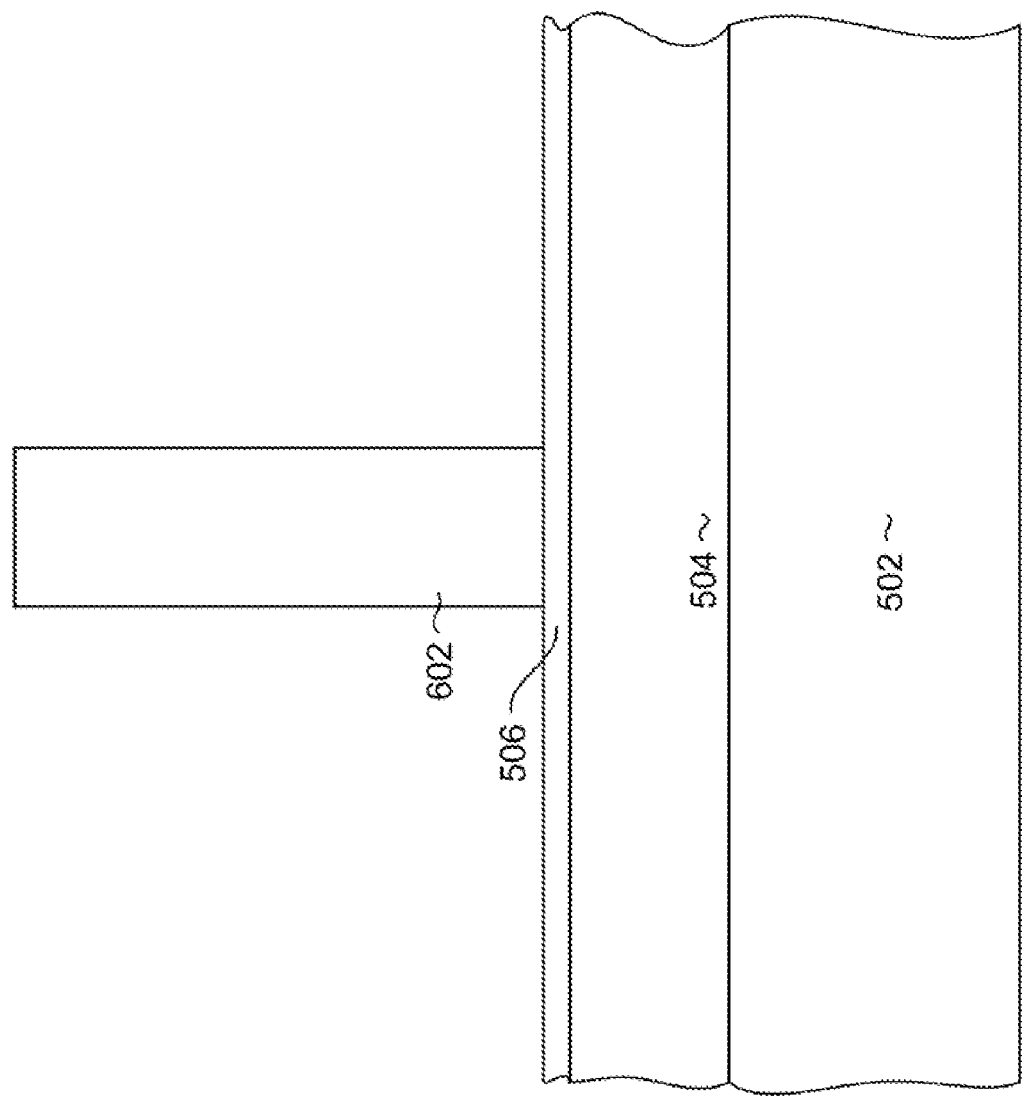

With reference now to FIG. 6, a mask 602 is formed over the thin alumina layer 506. The mask 602 can include a resist layer, and may include other layers such as an image transfer layer, antireflective layer, hard mask layer, etc. All of these layers will be referred to as mask layer 602 for purposes of simplicity. The mask 602 is patterned by a photolithographic process and possibly other image transfer processes that may include reactive ion etching.

Figure 7:
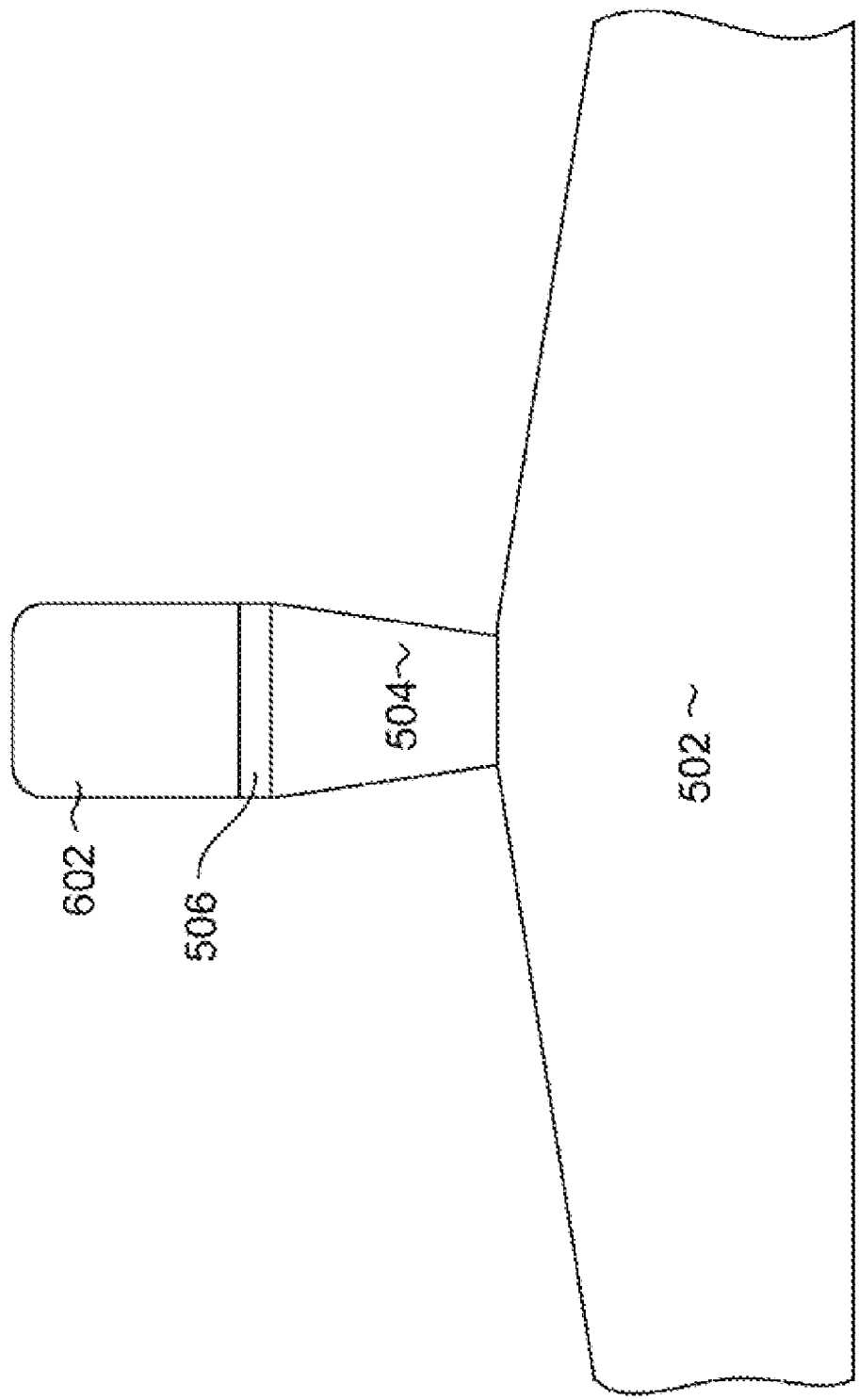
Figure 8:
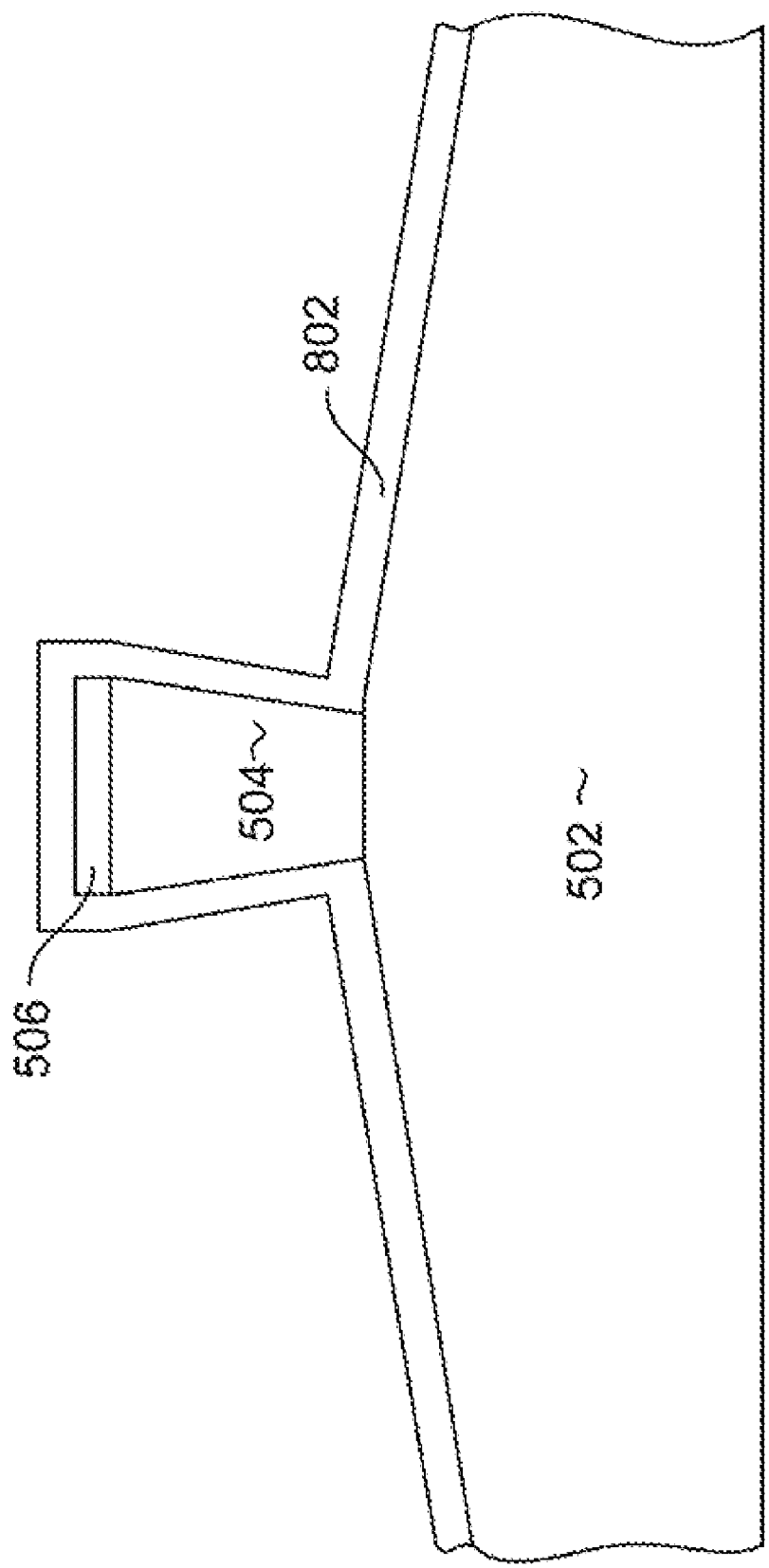
Figure 9:
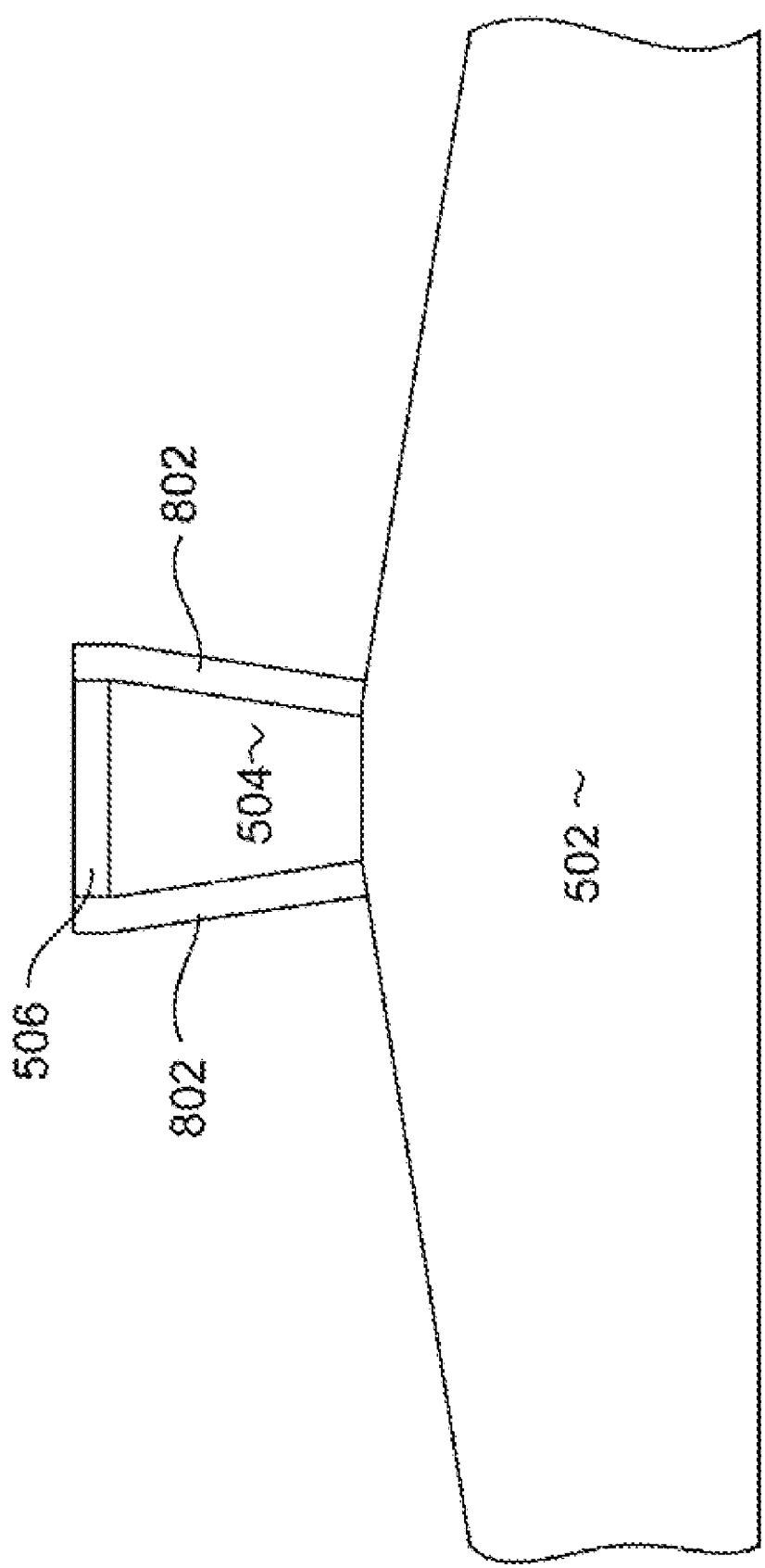

Then, with reference to FIG. 7, an ion milling process is performed to remove portions of the thin alumina layer 506 and write pole material 504. The ion milling can be performed at one or more angles relative to normal in order to form the resulting write pole 504 with a desired trapezoidal shape, and also to remove re-deposited material from the sides of the write pole 504. Then, the remaining photoresist 602 is stripped off, and a non-magnetic side gap material layer 802 is conformally deposited, resulting in a structure such as that shown in FIG. 8. The non-magnetic side gap material layer is preferably alumina deposited by a conformal deposition process such as atomic layer deposition or chemical vapor deposition. A directional material removal process such as ion milling can then be performed to preferentially remove horizontally disposed portions of the side gap layer 802 resulting in non-magnetic side walls 802 and a top gap 506 as shown in FIG. 9.

Figure 10:
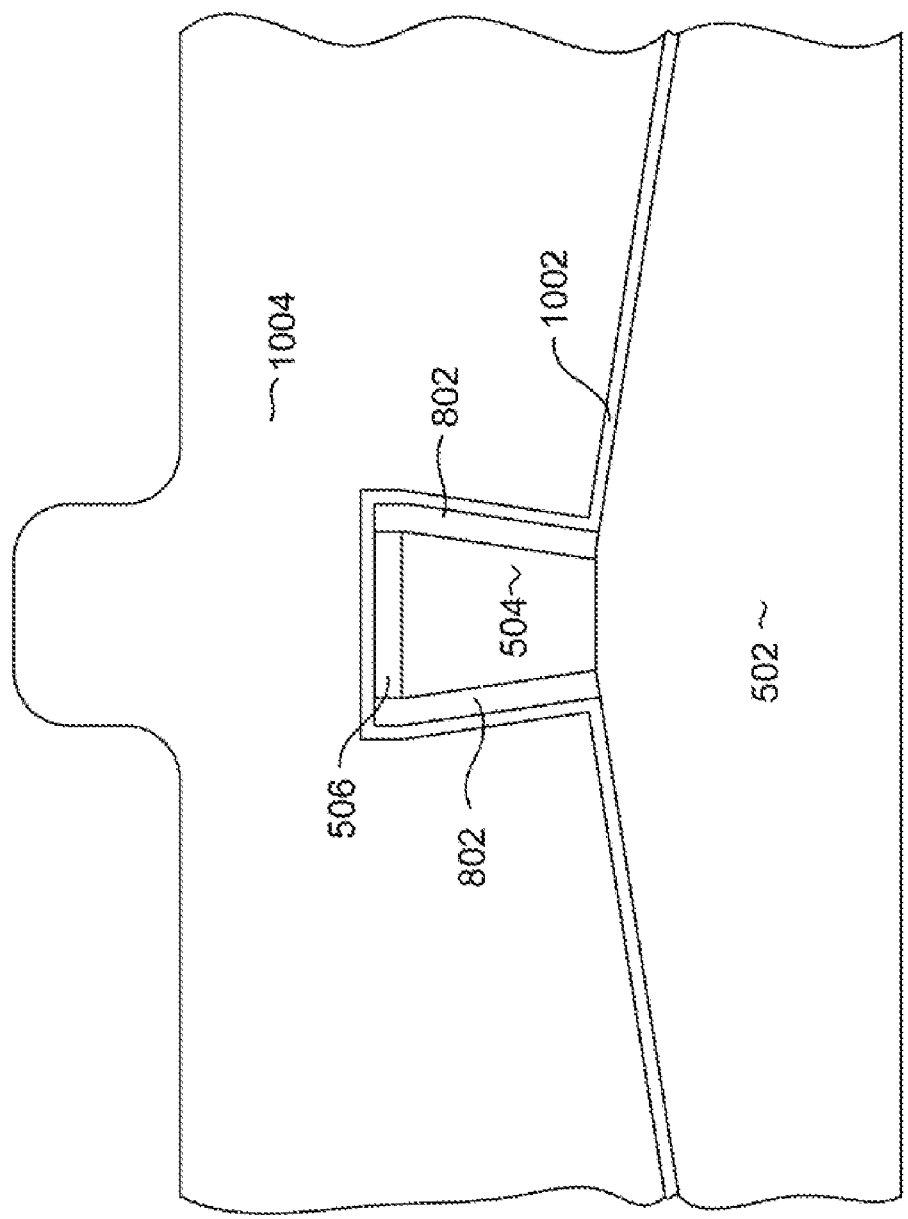
Figure 11:
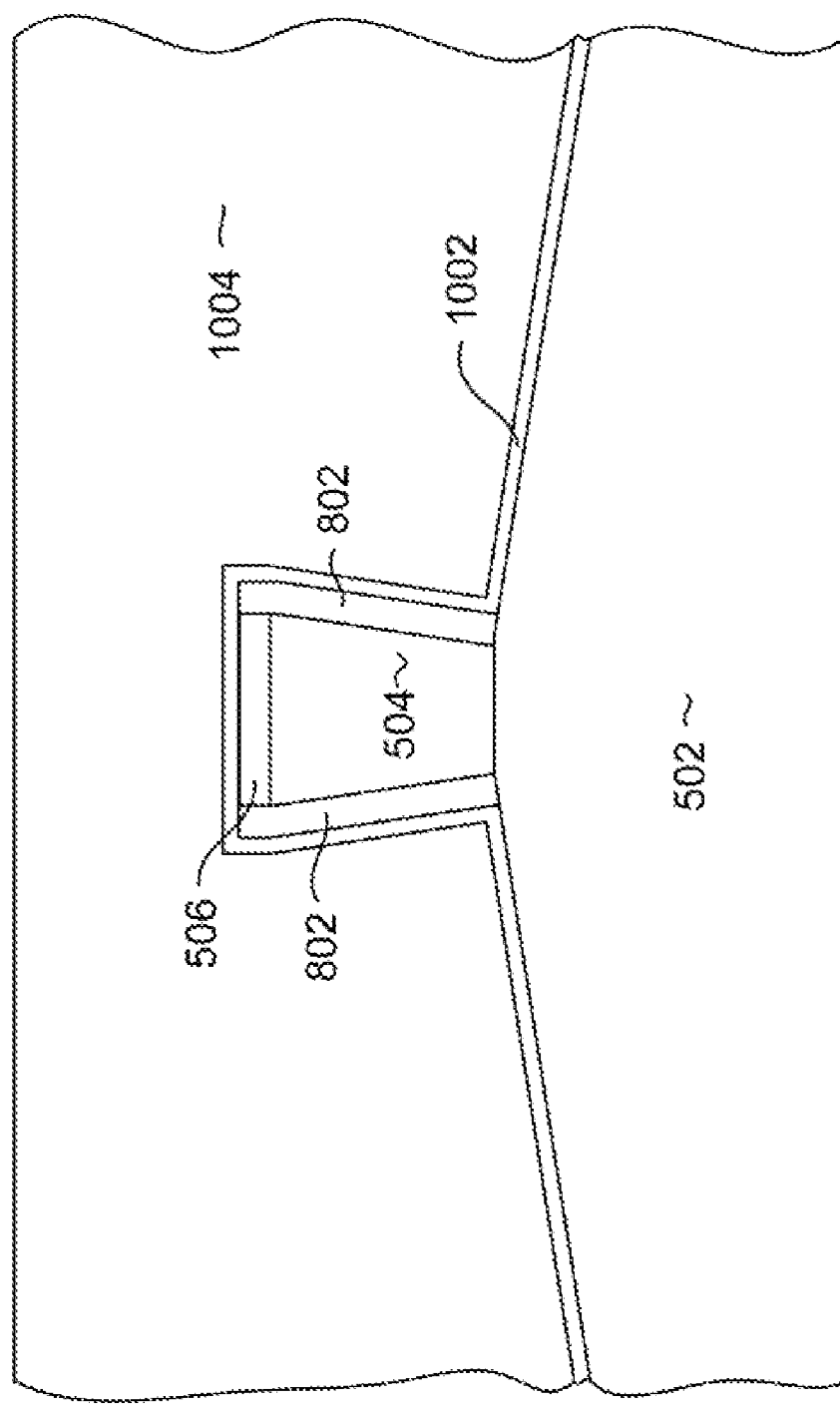
Figure 12:
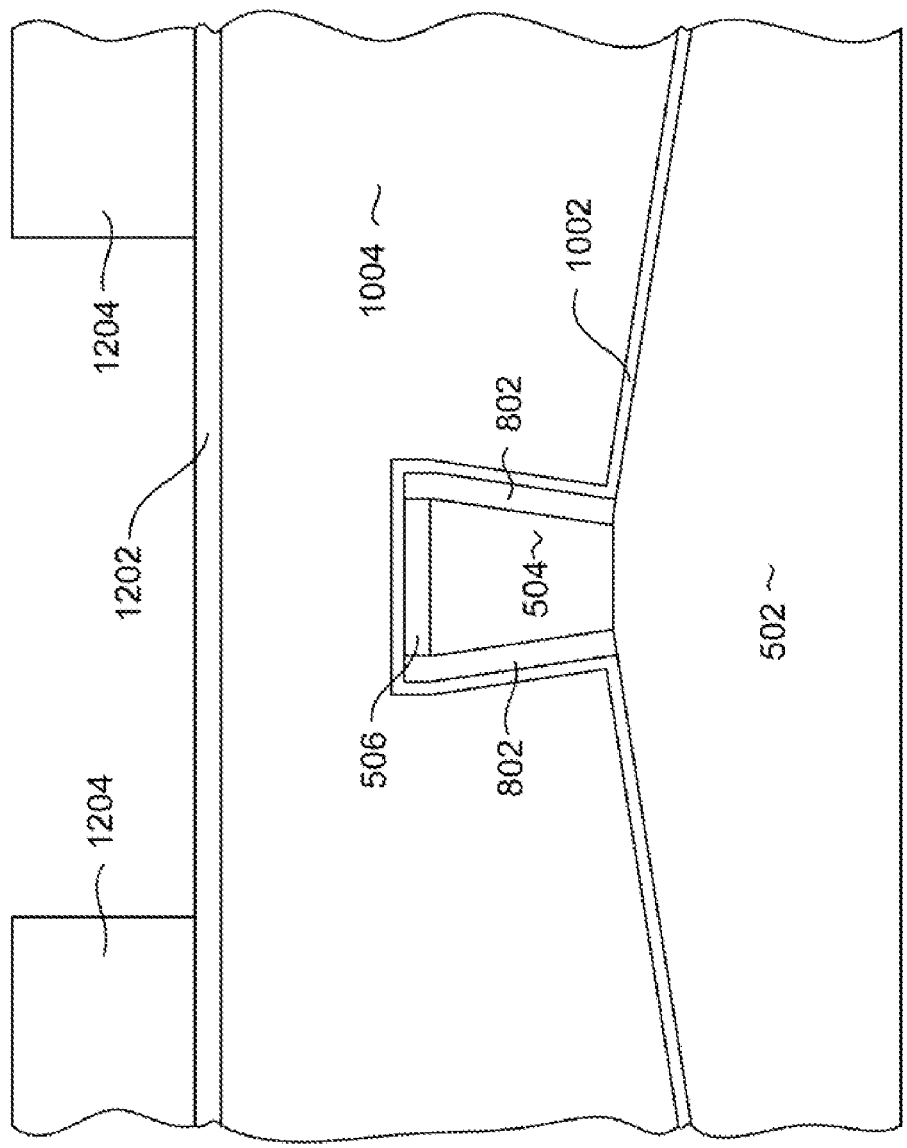

Then, with reference to FIG. 10, an electrically conductive seed layer 1002, such as Rh, Ru, or Cr, is deposited, followed by a thick RIEable refill layer 1004. The term "RIEable" is used herein to describe a material that can be removed by Reactive Ion Etching (RIE). The RIEable refill layer 1004 can be, for example $SiO_2$, and is deposited to a thickness that is higher than the write pole 504 and hard mask 506. The RIEable refill layer 1004 can also be constructed of SiN, SiC or TaO. A chemical mechanical polish (CMP) is then performed to remove the portion of the refill layer 1006 that bulges over the write pole 504, resulting in a structure as shown in FIG. 11.

With reference now to 12, a RIE mask structure is constructed by a process that utilizes a short wavelength photolithography. First, a RIE hard mask layer 1202, such as Rh, NiFe, Pt, or Ru is deposited, and a patterned mask structure 1204 is formed over the hard mask layer 1204. The mask structure 1204 can be a photolithographically patterned photoresist mask structure having an opening that is configured to define a wrap-around magnetic shield.

Figure 13:
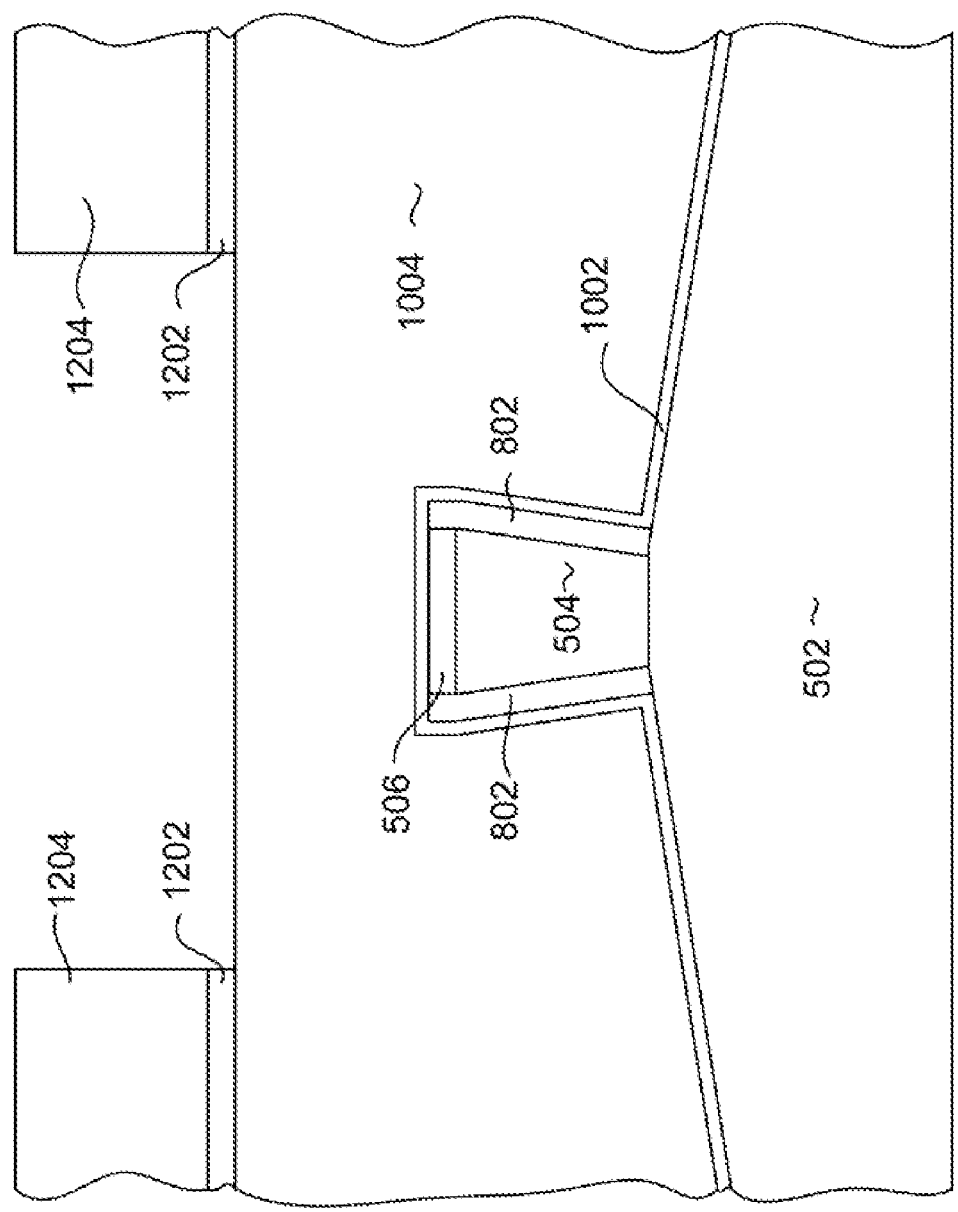
Figure 14:
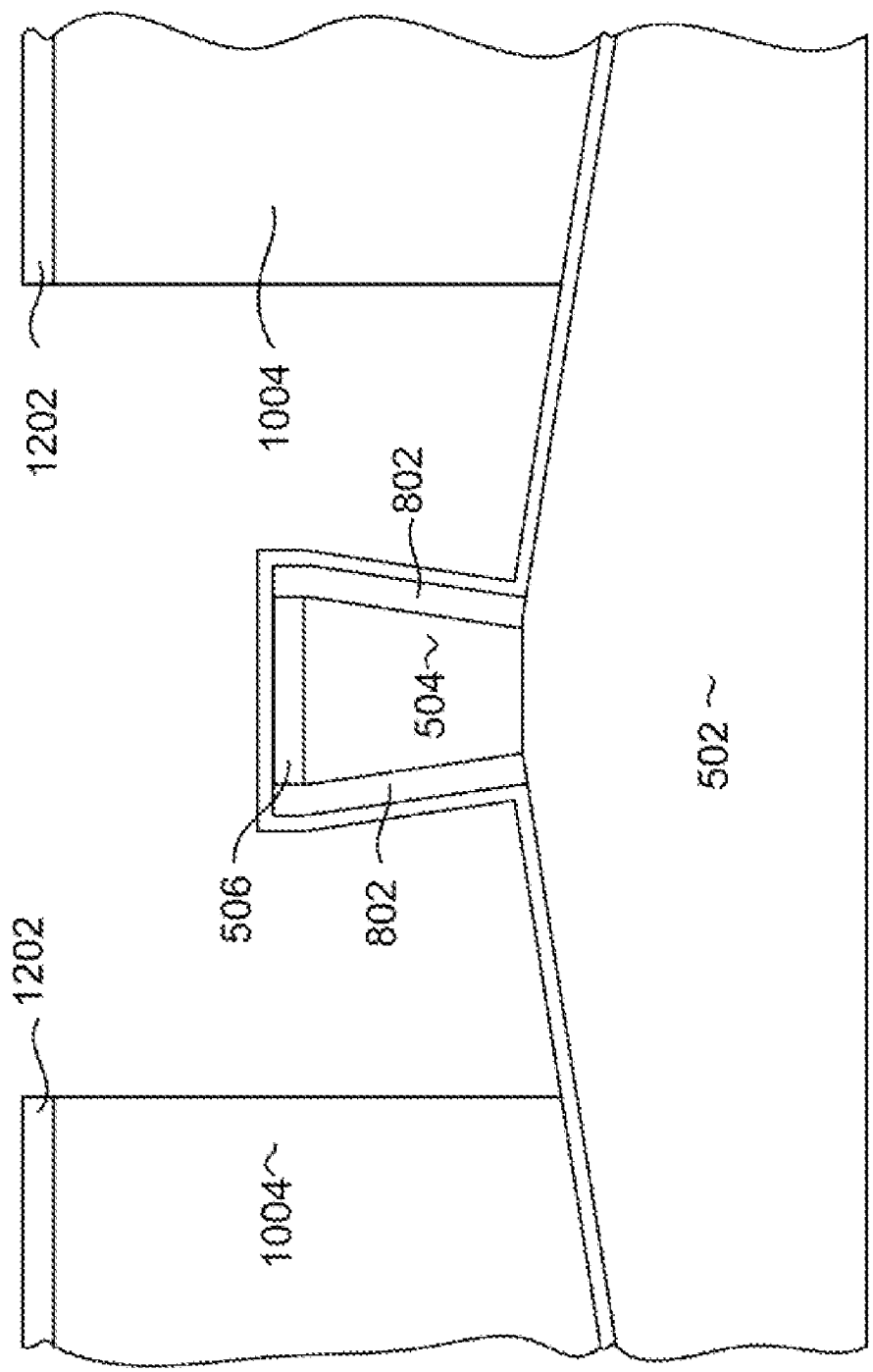

With reference now to FIG. 13, an ion milling is performed remove portions of the hard mask 1202 that are not protected by the mask structure 1204, thereby transferring the image of the mask 1204 onto the underlying hard mask 1202. Then, with reference to FIG. 14, a Reactive Ion Etching (RIE) is performed to remove portions of the refill layer 1004 that are not protected by the hard mask 1202. This forms an opening in the refill layer 1004. The mask layer 1204 (FIG. 13) can be, and likely is, consumed by the RIE. The RIE can be performed in an atmosphere that can be, for example, $CF4$, $CHF_3$, $BCl_3$, $SF_6$, Ar, $O_2$ or $N_2$.

The mask layer 1204 can advantageously be formed by a highly accurate short wavelength photolithography. This accurate short wavelength photolithography provides a desired high accuracy mask definition, but also requires that the photoresist mask 1204 be constructed very thin. However, because the hard mask 1202 provides effective masking during RIE, and because the refill layer 1004 is constructed of a material that can be readily removed by reactive ion etching, the photoresist mask 1204 can he formed using this accurate short wavelength photolithography such as a 193 nm photolithography. In this way an effective RIE mask structure can he formed using this accurate short wavelength photolithography.

Figure 15:
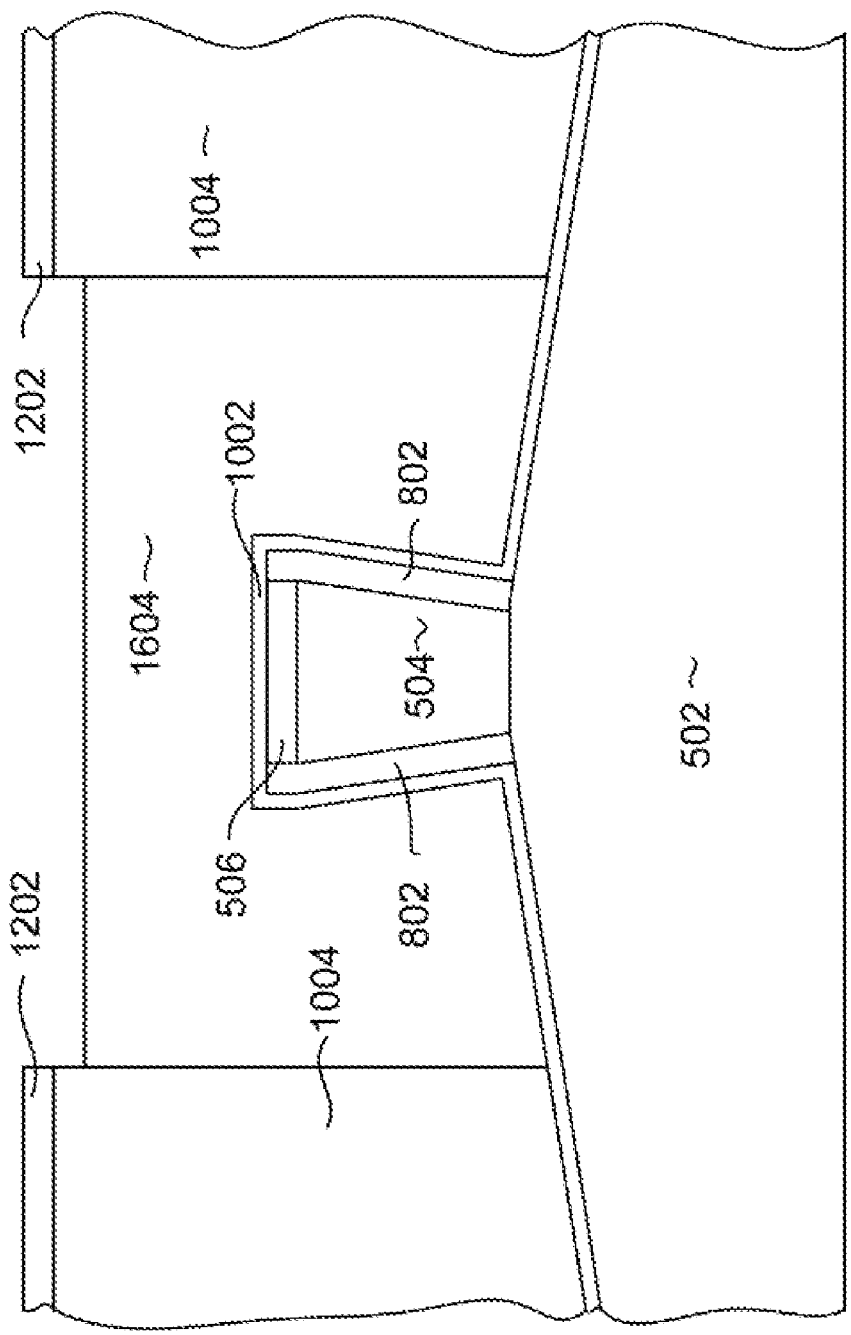

Then, with reference to FIG. 15, a magnetic material 1604 can be electroplated into the opening formed in the refill layer 1004, using the seed layer 1002 as a plating seed. The remaining hard mask 1202 can be removed by ion milling, and then the remaining refill layer 1004 can be removed by another Reactive Ion Etching (RIE).

Figure 16:
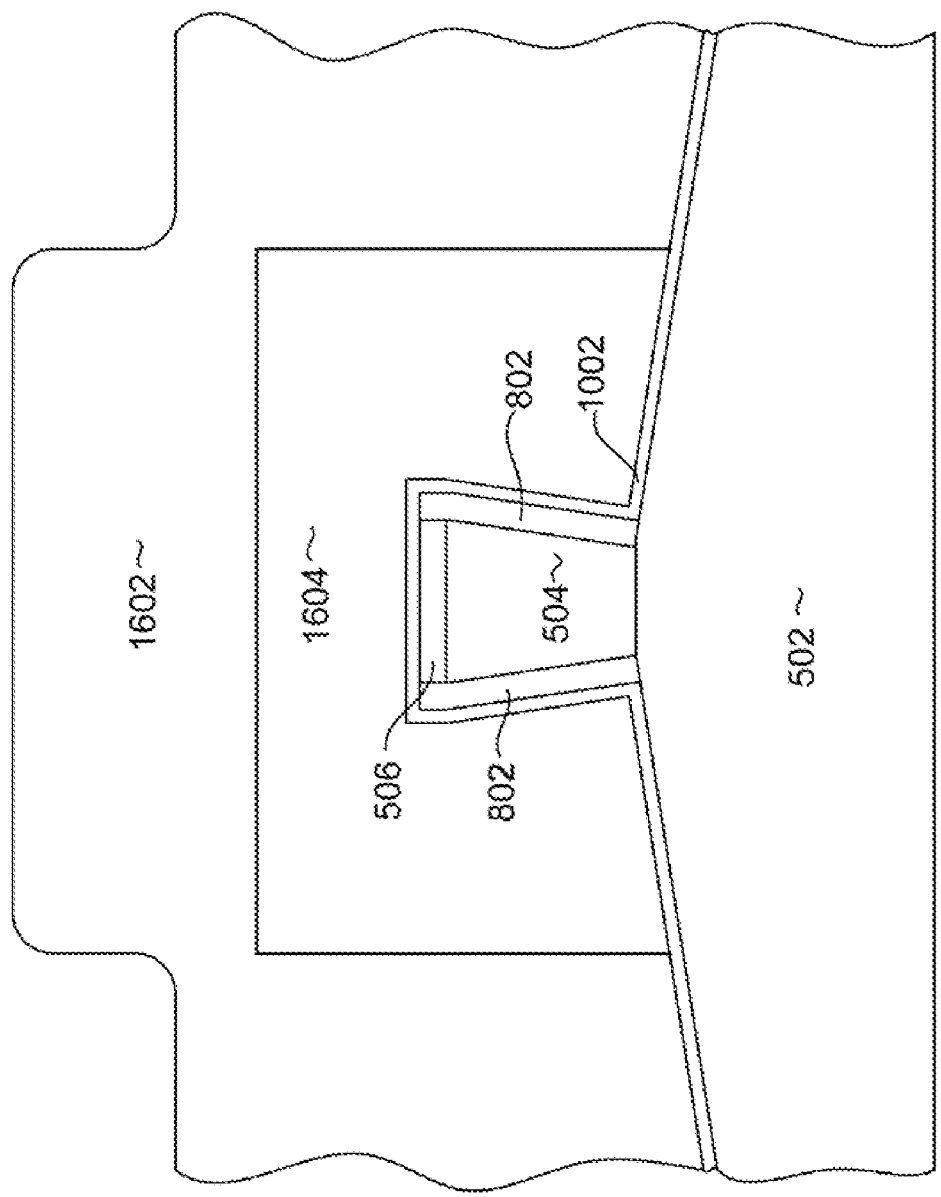
Figure 17:
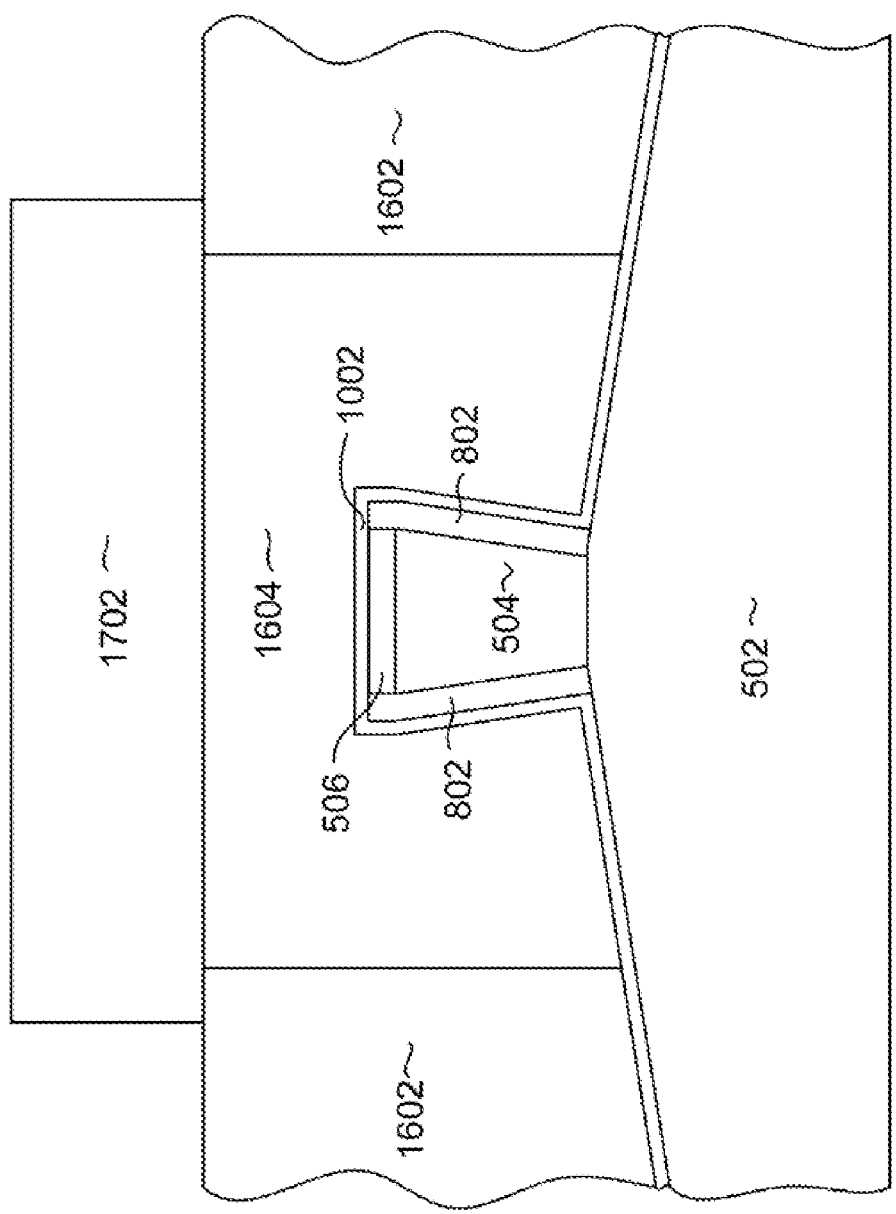

A non-magnetic, electrically insulating fill layer 1602 can then be deposited, resulting in a structure as shown in FIG. 16, with a magnetic, wrap around shield 1604, covered by a refill layer 1602. A chemical mechanical polishing process can then be performed sufficiently to expose the magnetic, wrap-around shield 1604 as shown in FIG. 17. An upper or trailing magnetic return pole 1702 can then be formed over the magnetic wrap around shield 1604. The upper return pole 1702 can be formed by constructing by methods familiar to those skilled in the art, which can include depositing an electrically conductive seed, forming a plating frame mask, electroplating a magnetic material such as NiFe and then removing the mask and unwanted portions of the seed layer.

Figure 18:
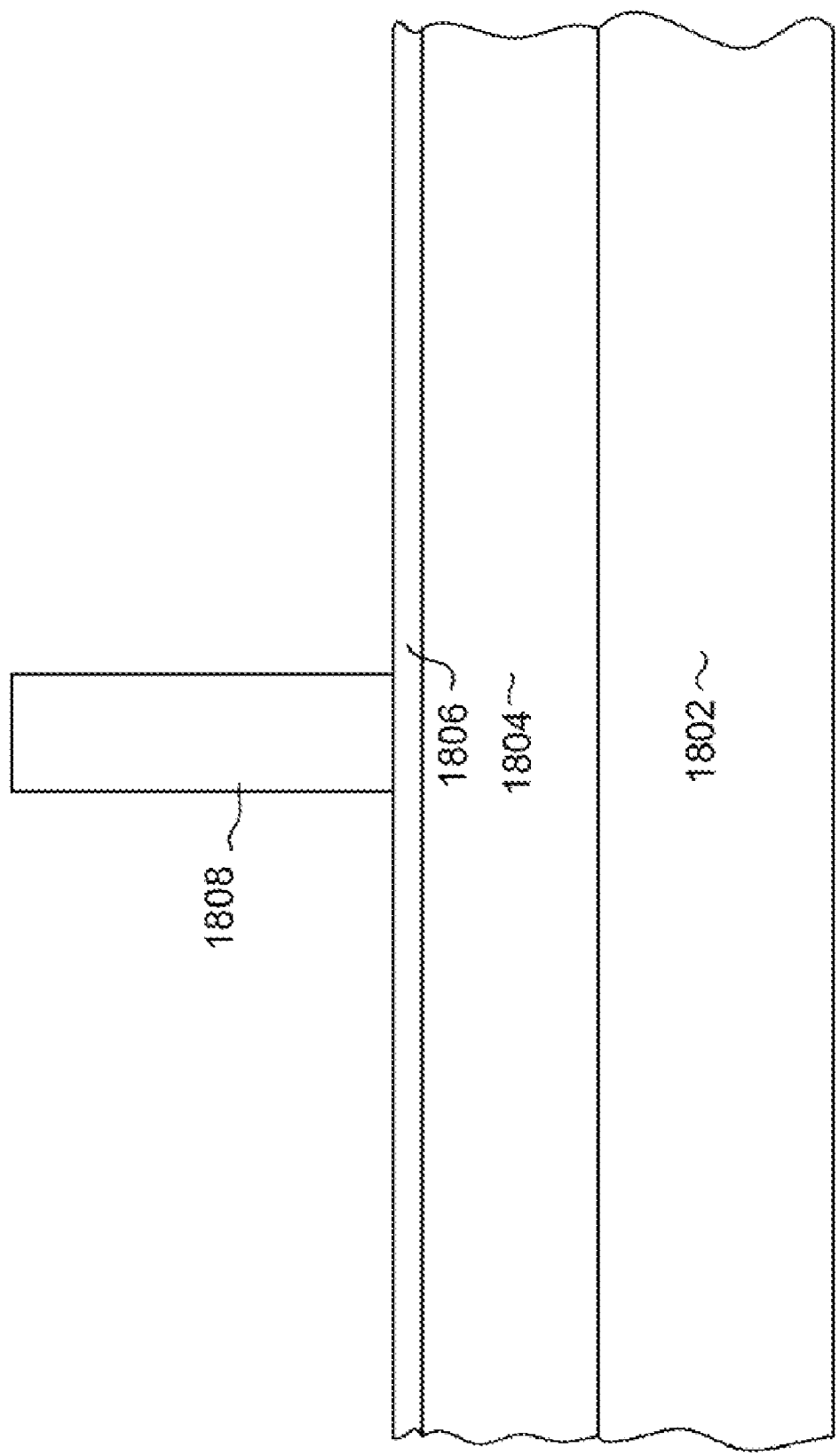
FIGS. 18-32 are views of a write head in various intermediate stages of manufacture illustrating a method of manufacturing a write head according to an alternate embodiment of the invention.

With reference now to FIGS. 18-32, an alternate method for manufacturing a magnetic write head according to an embodiment of the invention is described. With particular reference to FIG. 18, a substrate 1802 is provided and a magnetic write pole material 1804 is deposited over the substrate. A hard mask layer 1806, such as alumina, is then deposited over the write pole material 1804, and a photoresist mask structure 1808 is formed over the hard mask layer 1806.

Figure 19:
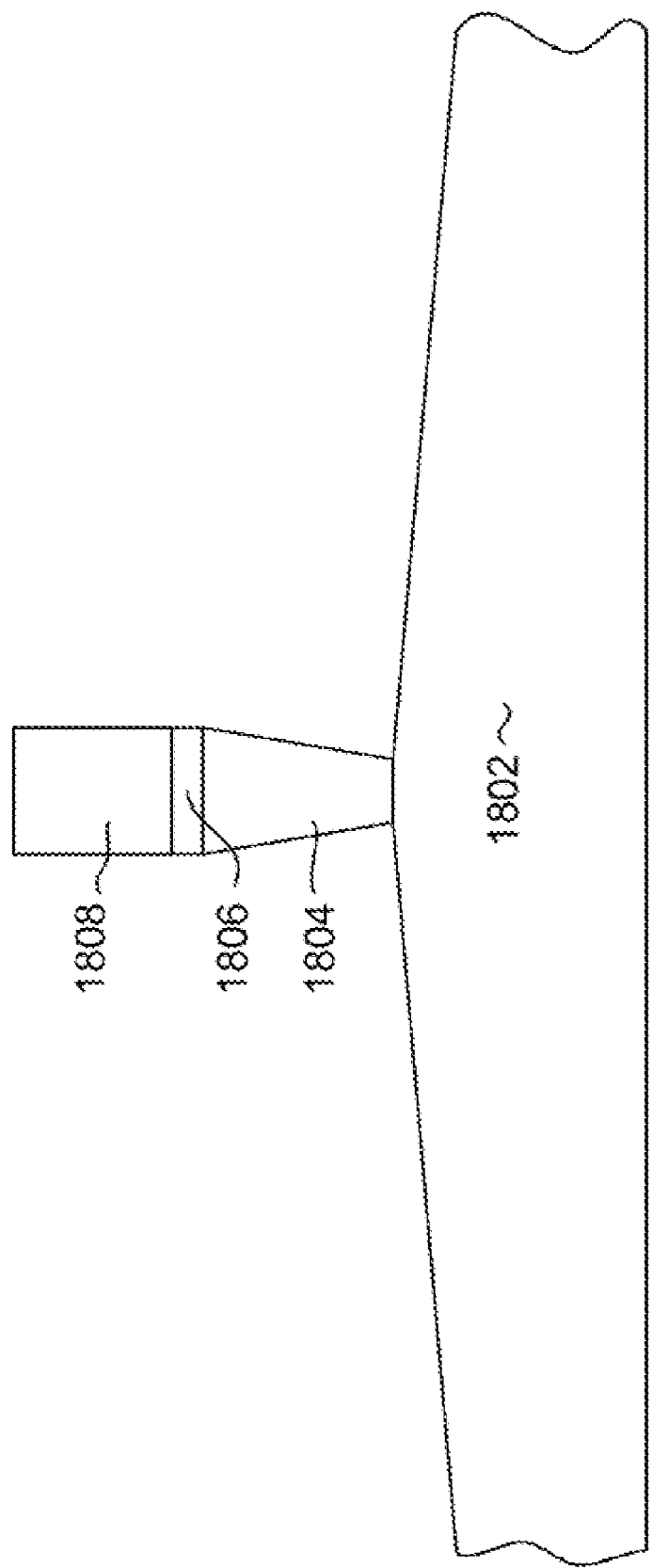
Figure 20:
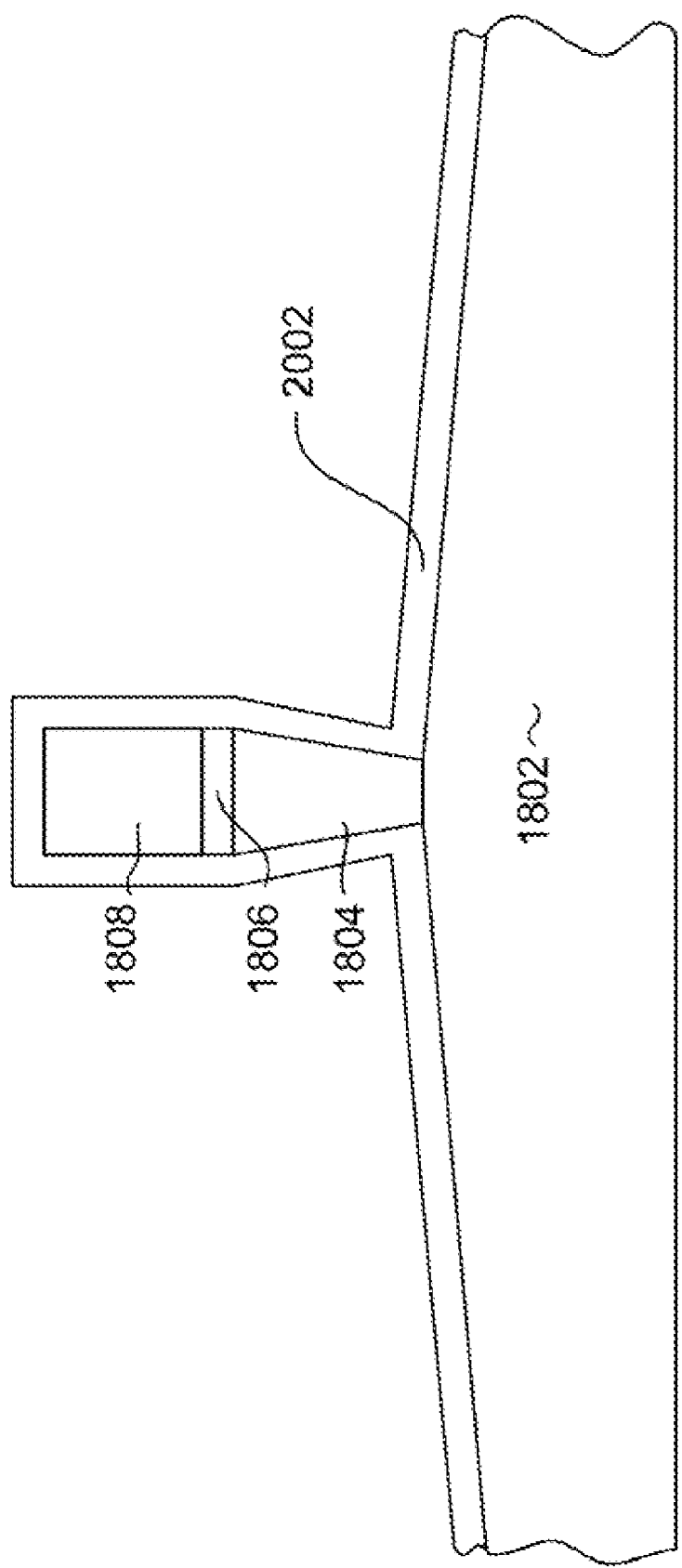

With reference now FIG. 19, an ion milling is performed to remove portions of the write pole material 1804 that are not protected by the mask structures 1806, 1808. The ion milling can be performed in such a manner as to form the write pole 1804 with a trapezoidal shape, as shown. With reference to FIG. 20, a layer of non-magnetic side gap material 2002 is deposited. The side wall material 2002 is preferably alumina and is preferably deposited by a conformal deposition method such as atomic layer deposition (ALD).

Figure 21:
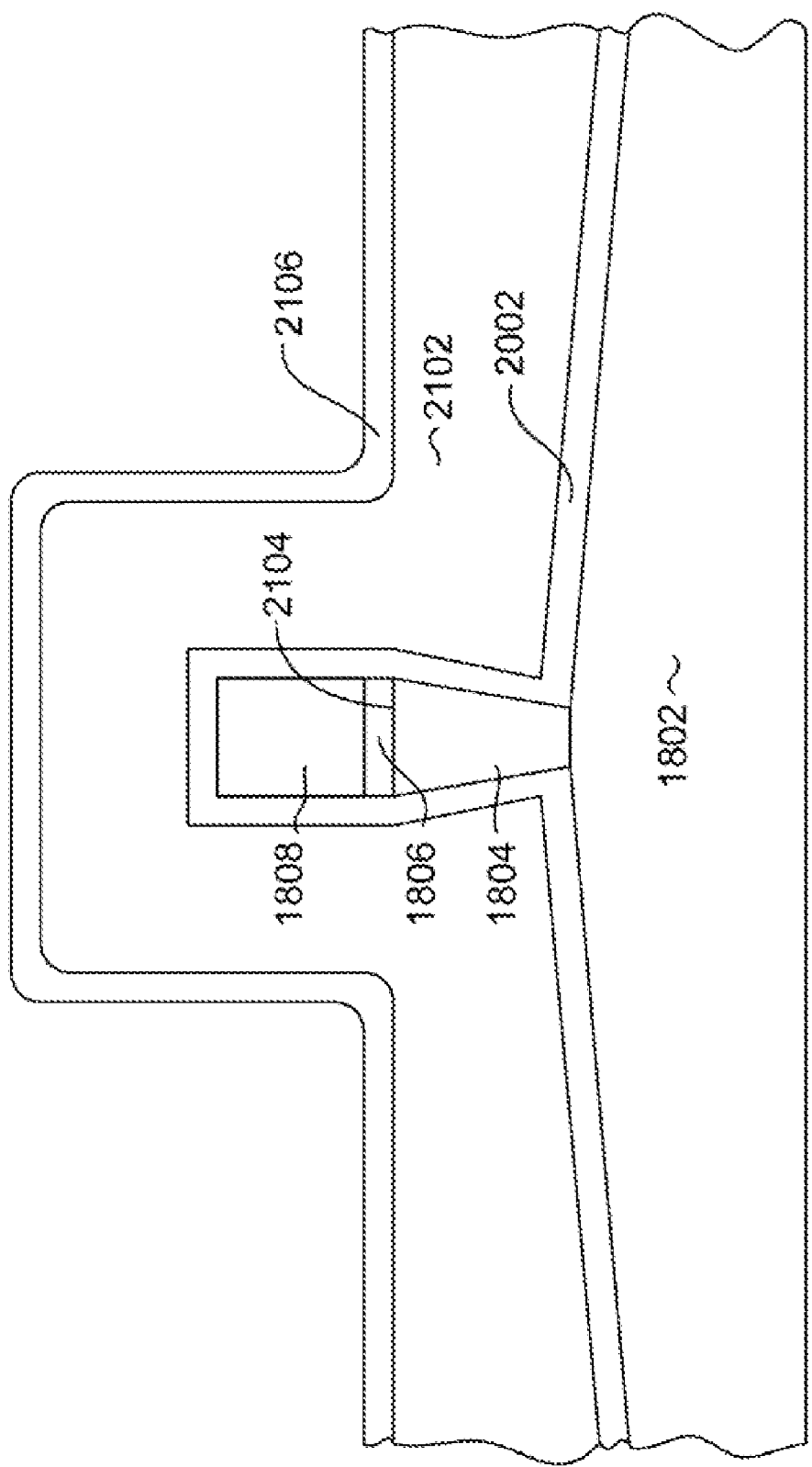
Figure 22:
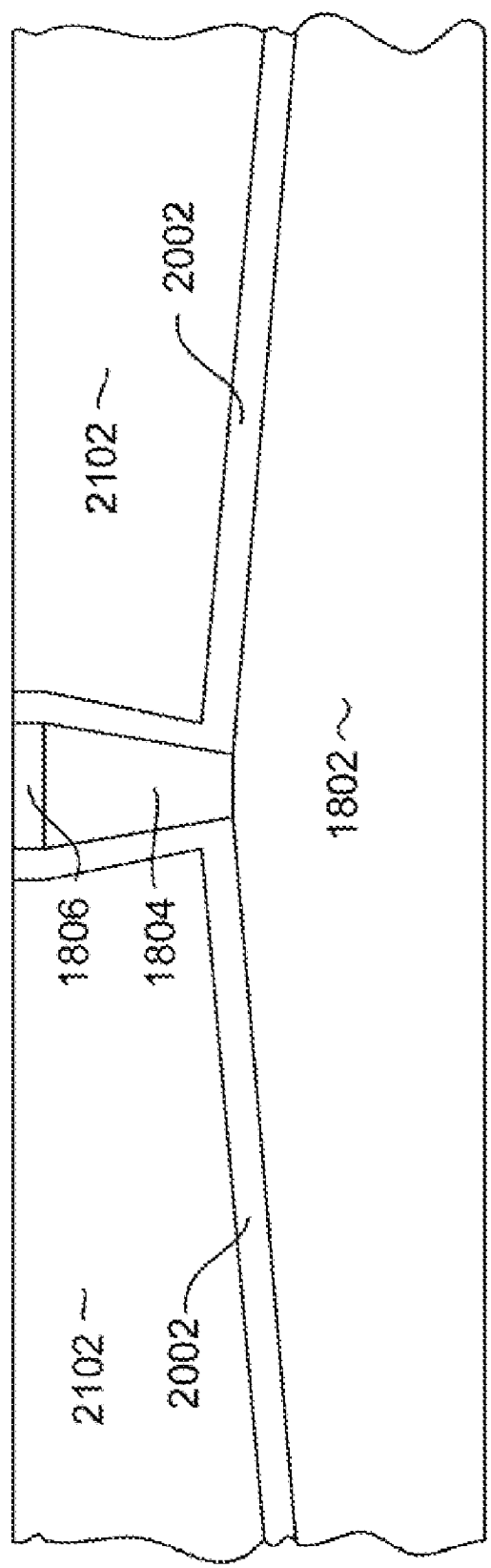

With reference now to FIG. 21, a first RIEable refill layer 2102 is deposited. The first RIEable refill layer 2102 is preferably SiO$_2$, SiN, SiC or TaO, and is preferably deposited to about he level of the top (or leading edge) 2104 of the write pole 1804. A CMP stop layer 2106 is then deposited over the first RIEable refill layer 2102. The CMP stop layer is a material that is resistant to removal by Chemical Mechanical Polishing (CMP), such as Diamond Like Carbon (DLC), Rh, Pt, Ru or Cr.

A chemical mechanical polishing (CMP) is then performed, to remove the portions of the refill layer 2102 and CMP stop layer 2106 that extend over the write pole (i.e. the portions that form a bump over the write pole). This CMP also removes the remaining photoresist mask 1808. This CMP also removes the portions of the non-magnetic side wall 2002 that extend over the write pole 1804 and over the mask layers 1806, 1808. After the CMP, any remaining CMP top layer 2106 can be removed by ion mill, resulting in a structure such as that shown in FIG. 22.

Figure 23:
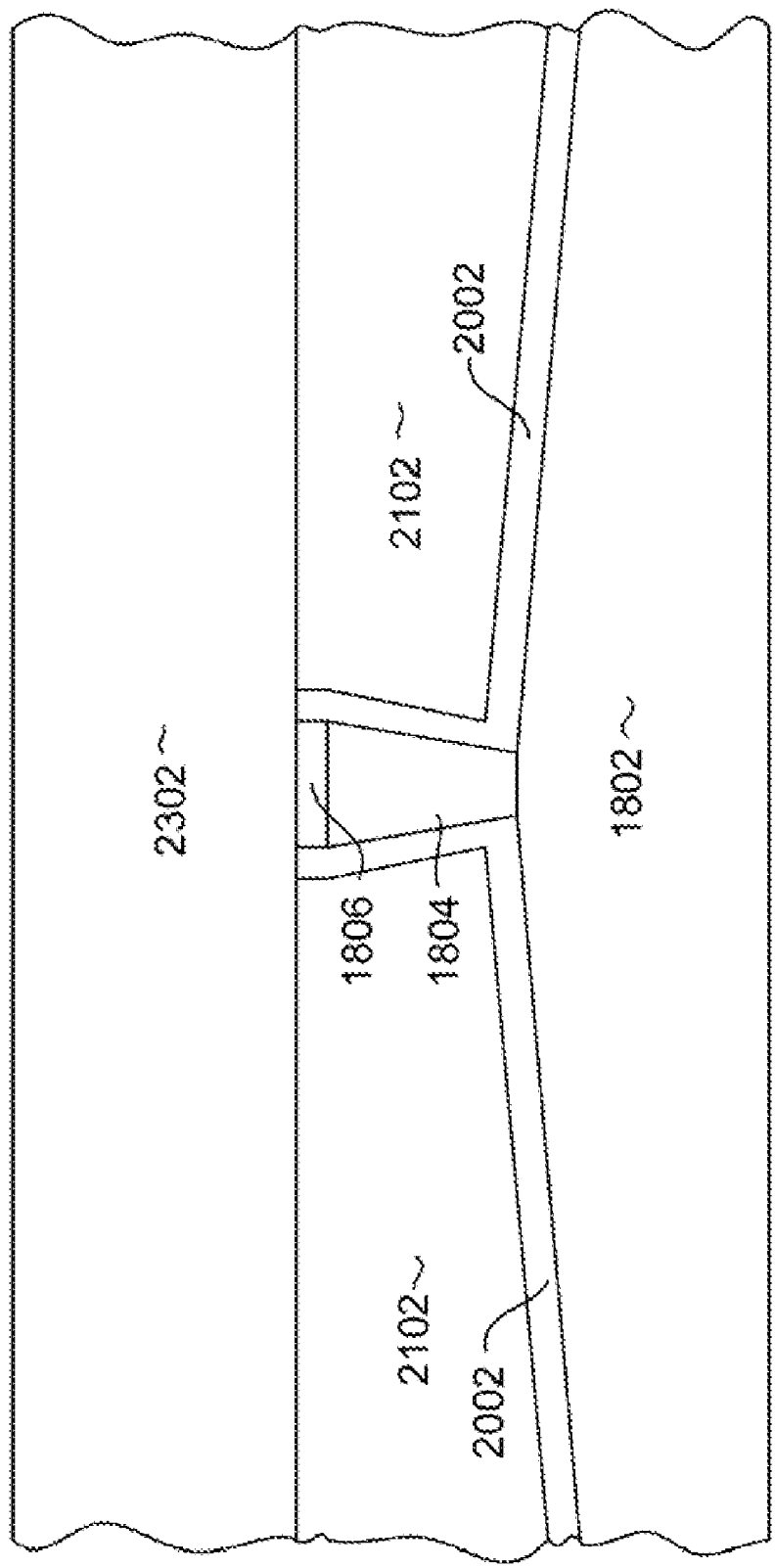
Figure 24:
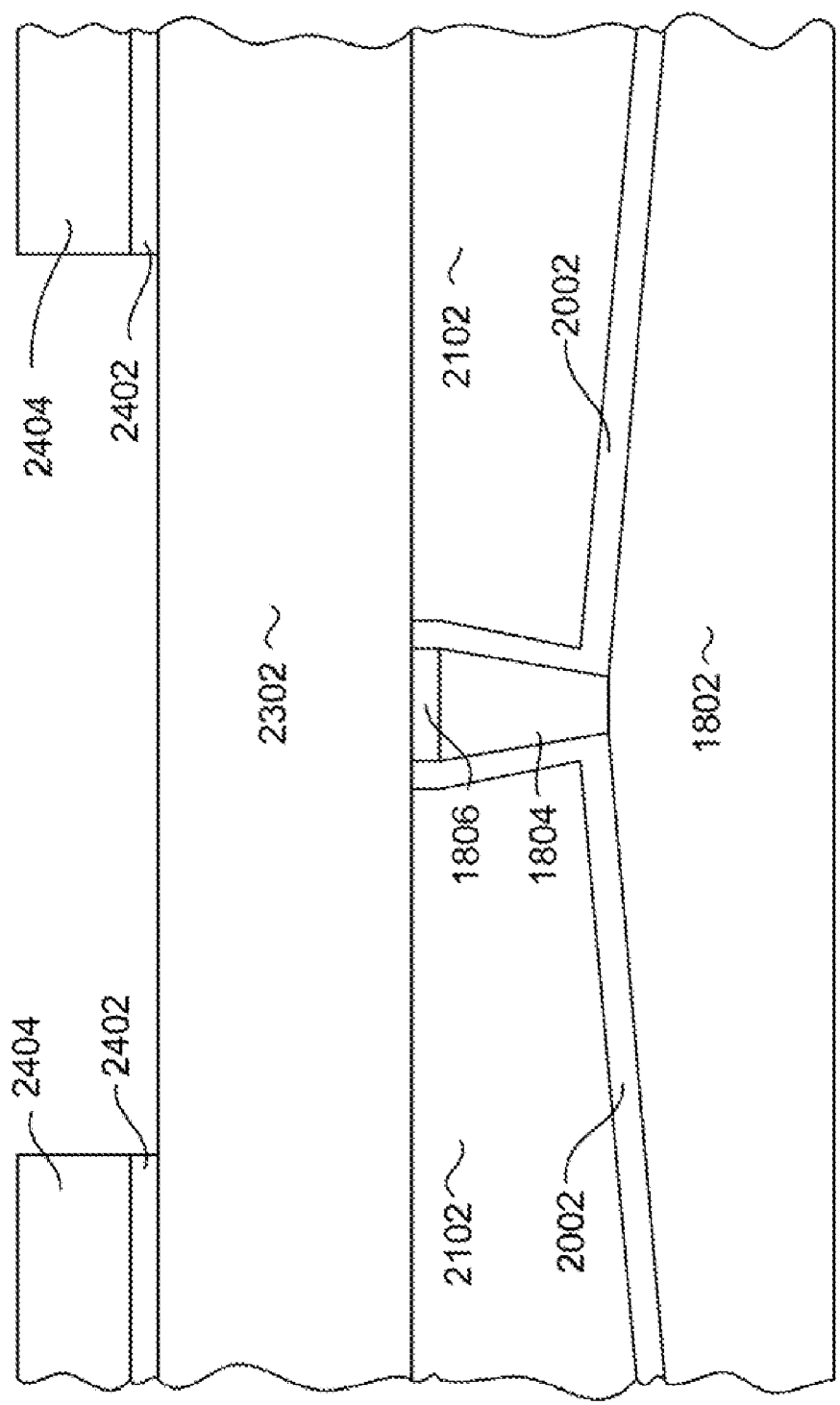

Then, with reference to FIG. 23, a second RIEable refill layer 2302 is deposited. With reference to FIG. 24, a mask structure including a hard mask 2402 and a photoresist mask 2404 is formed over the second RIEable refill layer 2302. The mask structure can be formed by depositing a RIE resistant hard mask material such as Rh, NiFe, Pt or Ru, and then depositing and photolithographically patterning a photoresist layer to form a photoresist mask 2404 having an opening configured to defined a wrap around shield. An ion milling can be performed to transfer the image of the photoresist layer 2404 onto the underlying hard mask layer 2402. As with the previously described embodiment, the photoresist mask 2402 can be defined by an accurate, high resolution, short wavelength photolithography, such as a 193 nm photolithography.

Figure 25:
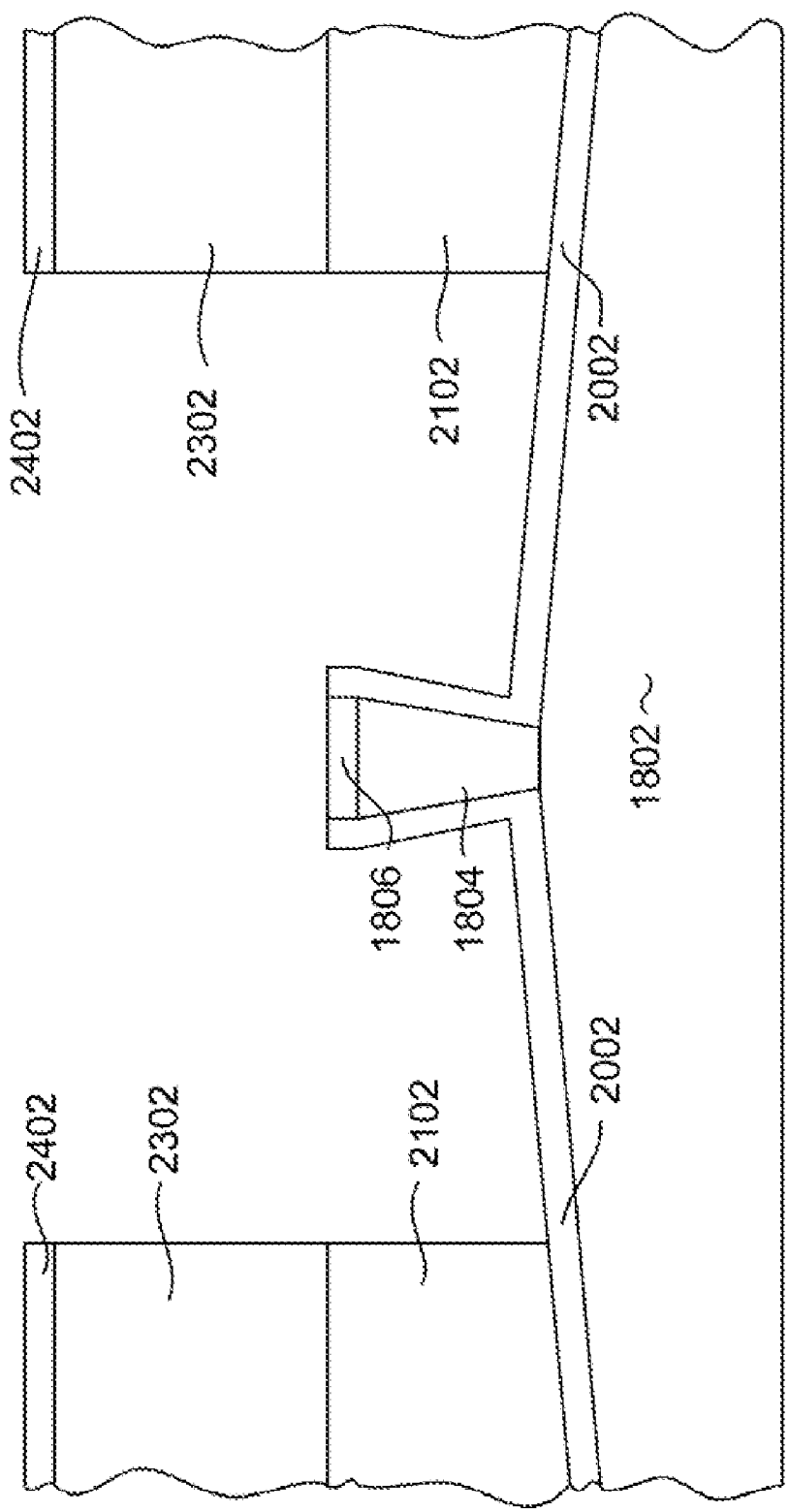
Figure 26:
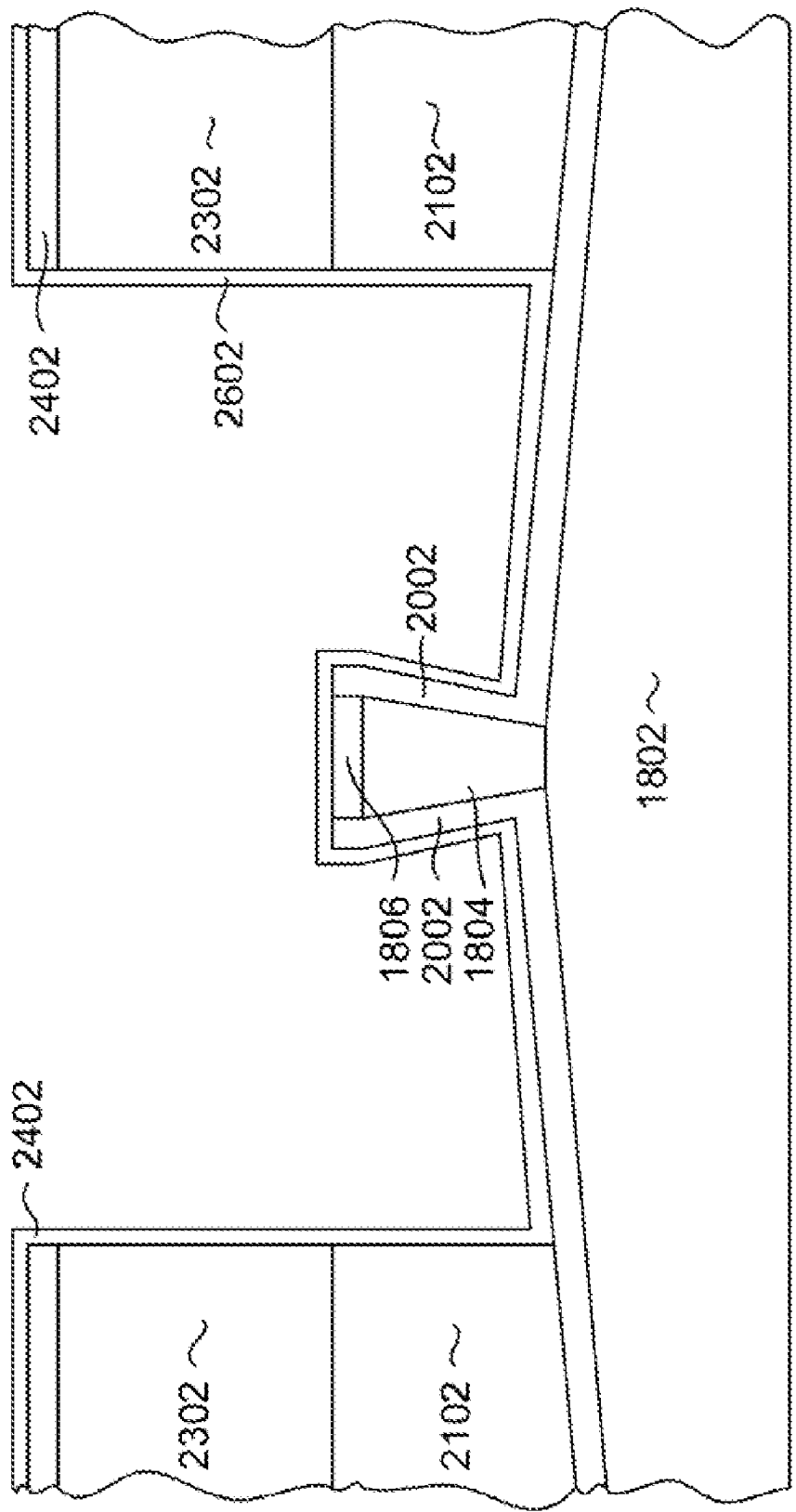
Figure 27:
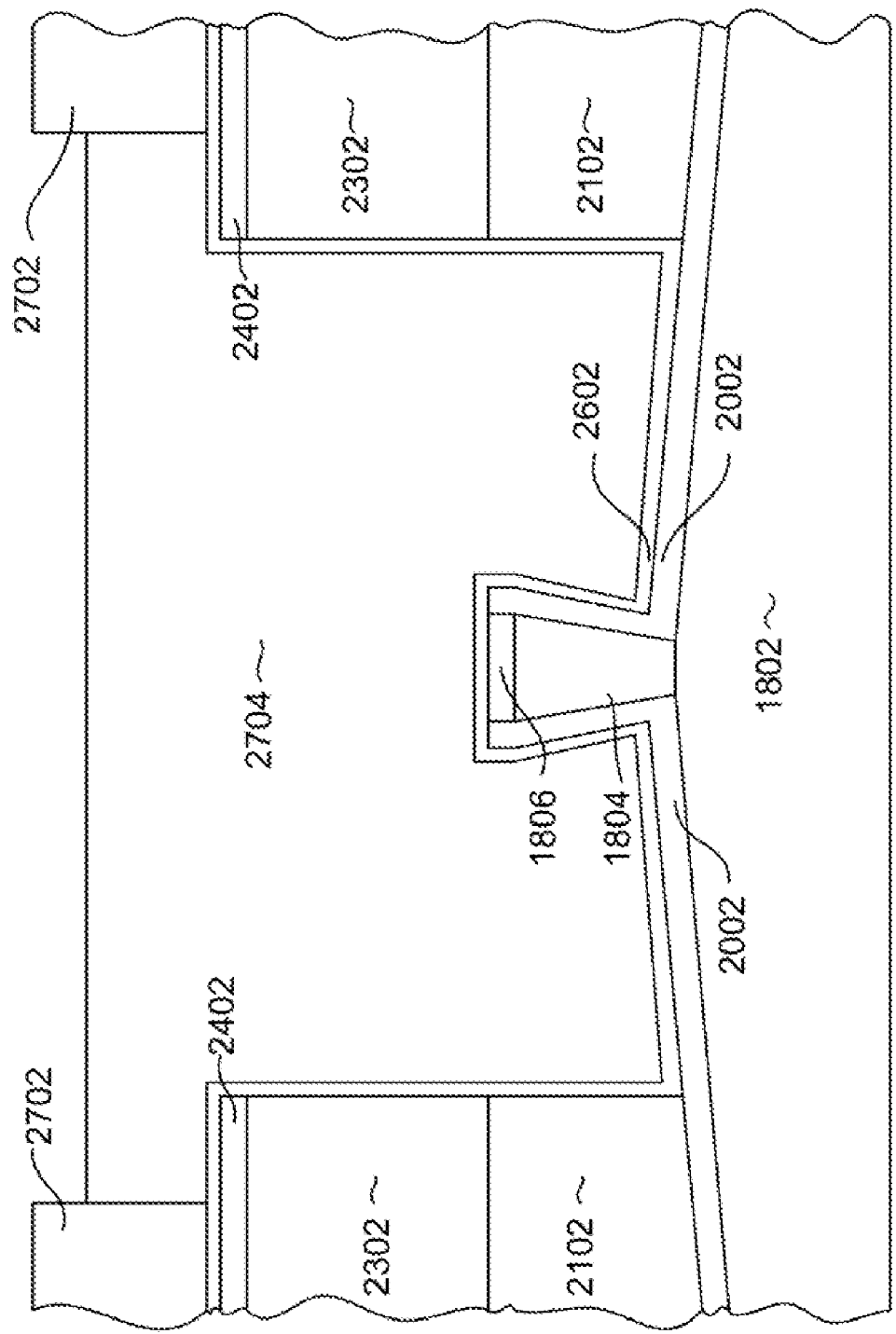

Then, with reference to FIG. 25, a reactive ion etching (RIE) is performed to remove portions of the first and second REIable refill layers 2102, 2402 to form an opening in these layers. As with the previously described embodiment, the RIE can be performed in an atmosphere such as CF4, CHF$_3$, BCl$_3$, SF$_6$Ar, O$_2$ or N$_2$. With reference to FIG. 26, an electrically conductive seed layer 2602 is deposited. Then, with reference to FIG. 27, a photoresist plating frame mask 2702 is constructed, having an opening that is as large as or larger than the opening formed in the refill layers 2102, 2302. The dimensions of the photoresist plating frame are not critical. Then, a magnetic material such as NiFe or CoFe is electroplated into the opening in the refill layers 2102, 2302, and mask 2702 to form a wrap around magnetic shield 2704.

Figure 28:
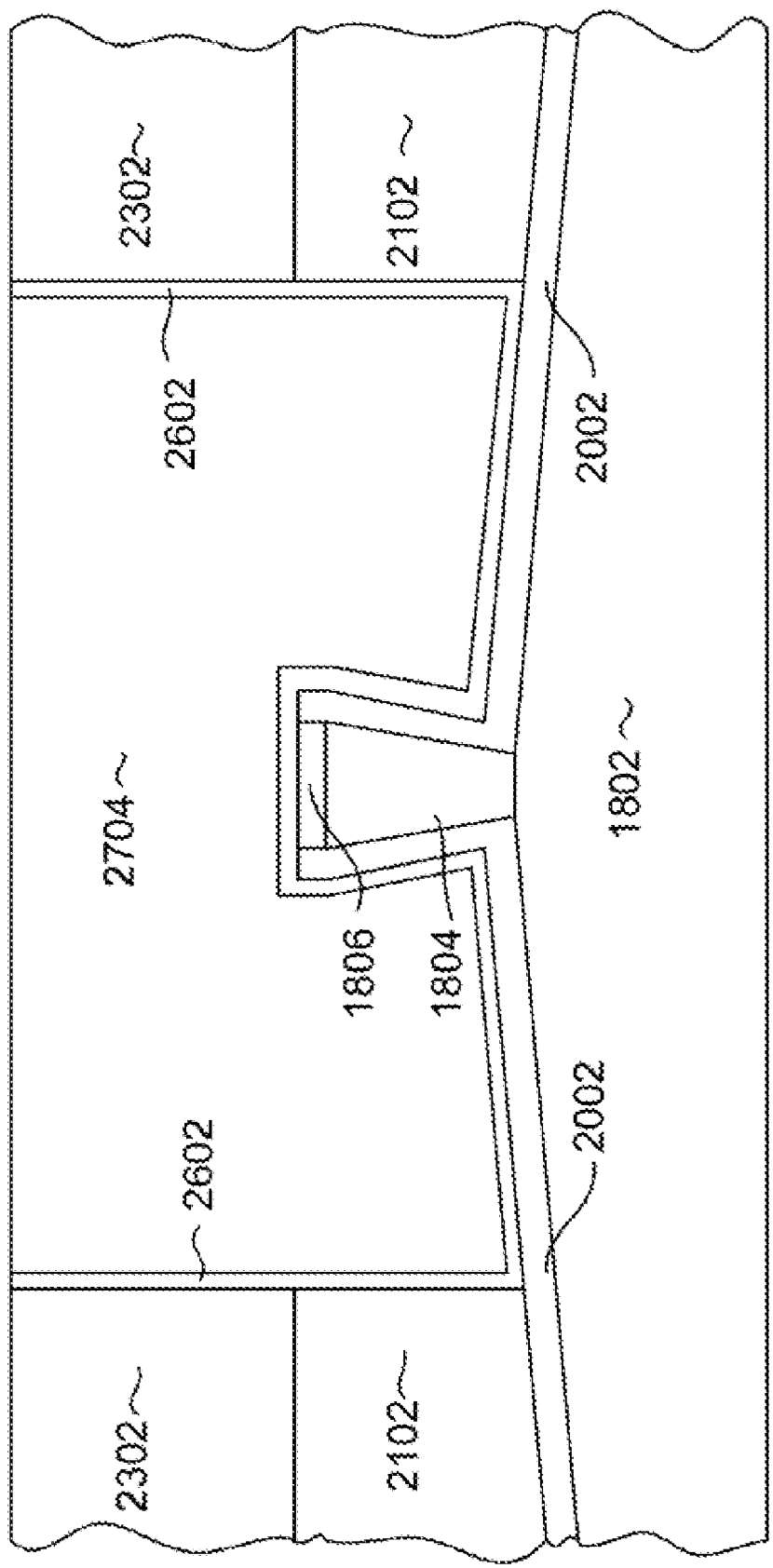
Figure 29:
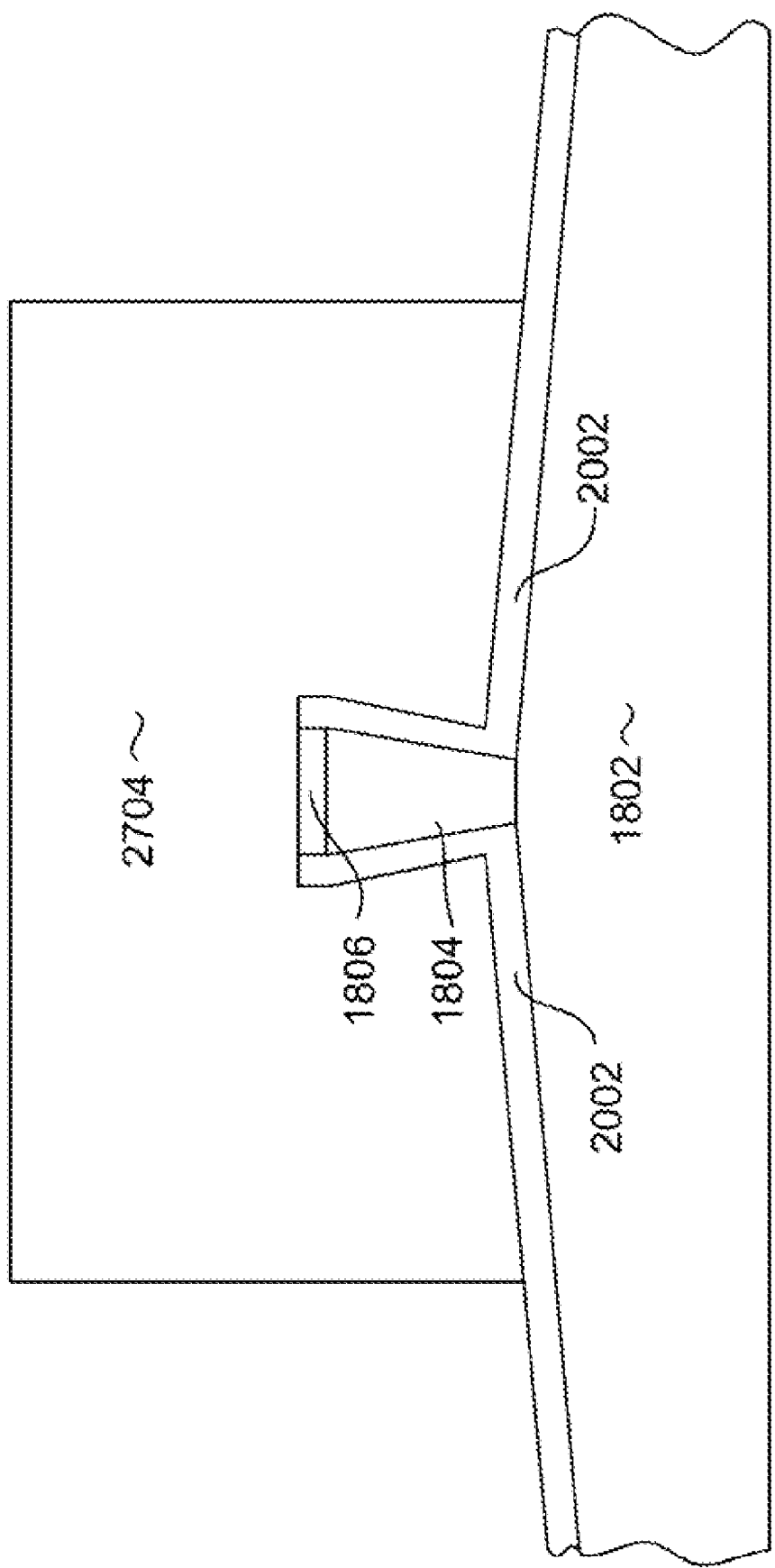
Figure 30:
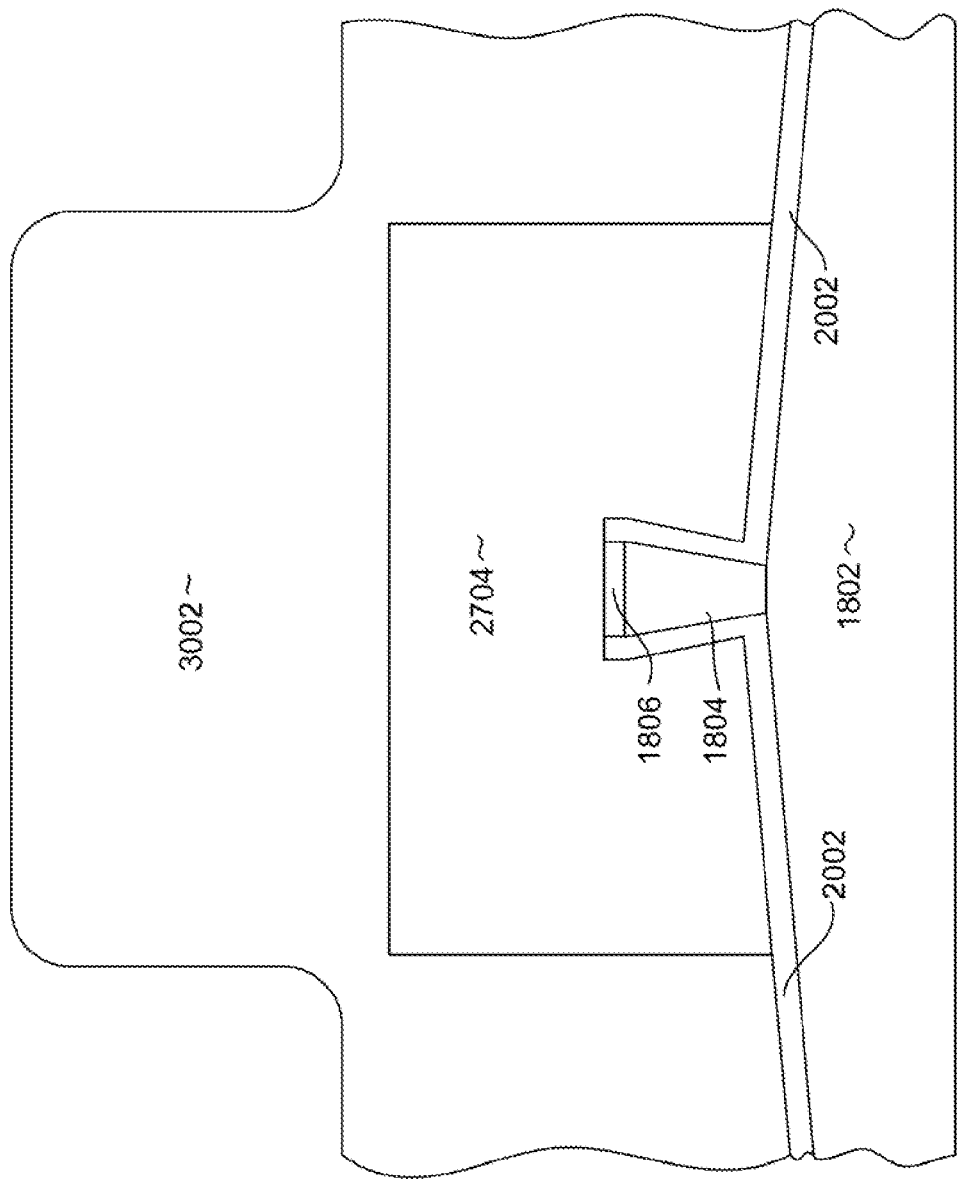
Figure 31:
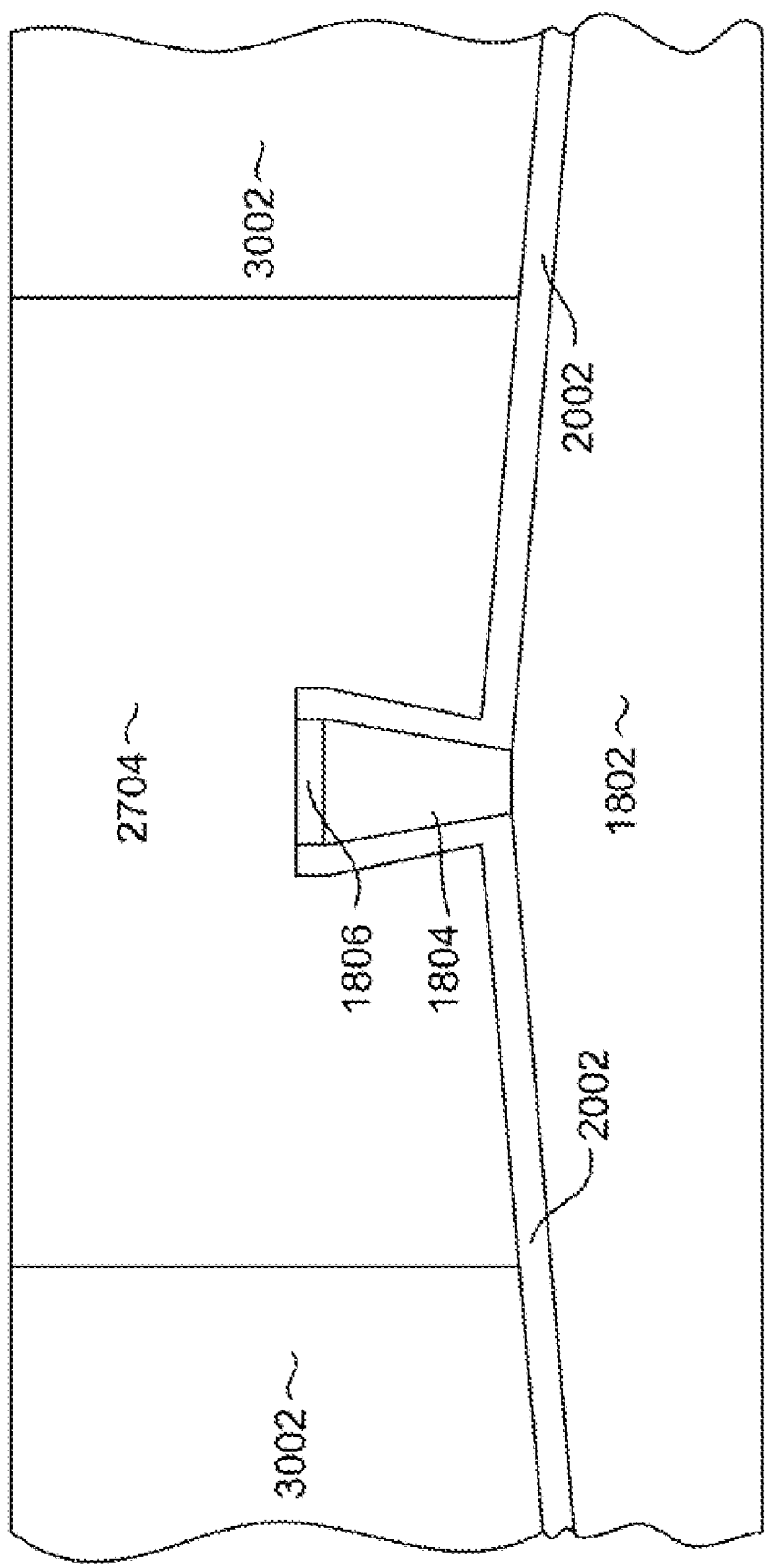
Figure 32:
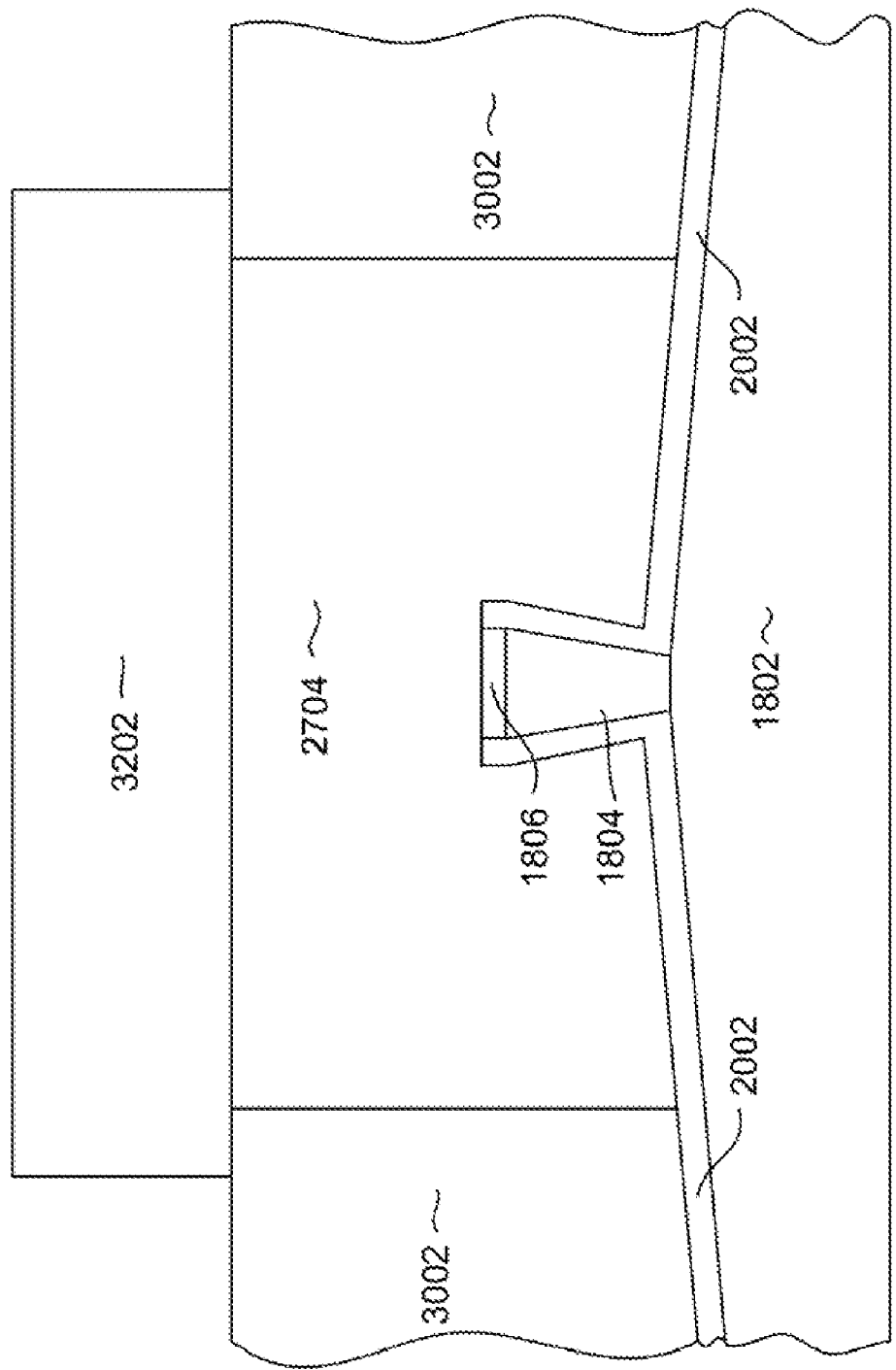

A chemical mechanical polishing process (CMP) can then be performed resulting in a structure such as that shown in FIG. 28. One or more reactive ion etching processes (RIE) can then be performed to remove the remaining refill layers 2102, 2302, resulting in a structure such as that shown in FIG. 29, and an alumina fill layer can be deposited resulting in a structure such as that shown in FIG. 30. A CMP can be performed to expose the shield 2704, resulting in a structure as shown in FIG. 31. Then, a magnetic return pole can be plated over the shield 2704, as shown in FIG. 32.

While various embodiments have been described, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A method for manufacturing a magnetic write head for perpendicular magnetic recording, comprising:
   providing a substrate;
   forming a magnetic write pole layer over the substrate, the write pole layer having a first mask structure formed thereover, the first mask structure including a hard mask layer directly on top of the magnetic write pole layer;
   conformally depositing a non-magnetic material;
   performing a directional material removal process to define a top gap and a side gap;
   depositing a RIEable refill layer;
   performing a first chemical mechanical polishing process;
   forming a RIE mask structure using short wavelength photolithography, the RIE mask structure having an opening configured to define a wrap around shield;
   performing a first reactive ion etching to remove portions of the RIEable refill layer that are not protected by the RIE mask structure; and
   electroplating a magnetic material to form the wrap-around shield.

2. The method as in claim 1 wherein the directional material removal process comprises ion milling.

3. The method as in claim 1 wherein the directional material removal process comprises a chemical mechanical polishing (CMP) process.

4. The method as in claim 1 wherein the RIEable refill layer comprises a material selected from the group consisting of SiO$_2$, SIN, SiC and Tao.

5. The method as in claim 1 wherein the RIE mask layer comprises NiFe, Rh, Pt, Ru.

6. The method as in claim 1 wherein the hard mask layer comprises alumina.

7. The method as in claim 1 wherein the reactive ion etching is performed in an atmosphere comprising a material selected from the group consisting of CF$_4$, CHF$_3$, BCl$_3$, SF$_6$, Ar, O$_2$ and N$_2$.

8. The method as in claim 1 wherein the magnetic write pole layer has first and second laterally opposed sides, the directional material removal process comprises ion milling and is performed sufficiently to form first and second non-magnetic side gap layers at first and the first and second sides of the write pole.

9. The method as in claim 1 further comprising, after depositing the magnetic material to form the wrap around magnetic shield:
   performing a reactive ion etching to remove at least a portion of the remaining refill layer;
   depositing an alumina fill layer; and
   performing a second chemical mechanical polishing process.

10. The method as in claim 1 the further comprising a step of forming a second mask structure that comprises performing a 193 nm photolithography to pattern a photoresist layer.

* * * * *